United States Patent
Peleg et al.

(10) Patent No.: US 11,171,711 B2
(45) Date of Patent: Nov. 9, 2021

(54) MAXIMIZING PERFORMANCE IN EXTENDED-COVERAGE WIRELESS COMMUNICATION NETWORK UNDER TRANSMISSION CONSTRAINTS

(71) Applicant: CAPACICOM LTD., Kfar Netter (IL)

(72) Inventors: Dan Peleg, Sde-Yizhak (IL); Christophe Jean Bataillard, London (GB); Nitzan Ron, Zichron Yaakov (IL); Avihay Sadeh-Shirazi, Tel Aviv (IL)

(73) Assignee: CAPACICOM LTD., Kfar Netter (IL)

( * ) Notice: Subject to any disclaimer, the term of this patent is extended or adjusted under 35 U.S.C. 154(b) by 0 days.

(21) Appl. No.: 16/636,648

(22) PCT Filed: Sep. 4, 2018

(86) PCT No.: PCT/IB2018/056729
§ 371 (c)(1),
(2) Date: Feb. 5, 2020

(87) PCT Pub. No.: WO2019/058198
PCT Pub. Date: Mar. 28, 2019

(65) Prior Publication Data
US 2021/0153033 A1   May 20, 2021

Related U.S. Application Data

(60) Provisional application No. 62/562,513, filed on Sep. 25, 2017, provisional application No. 62/681,111, filed on Jun. 6, 2018.

(51) Int. Cl.
*H04B 7/155* (2006.01)
*H04W 52/24* (2009.01)
(Continued)

(52) U.S. Cl.
CPC ......... *H04B 7/155* (2013.01); *H04B 7/15507* (2013.01); *H04W 16/26* (2013.01);
(Continued)

(58) Field of Classification Search
CPC ............ H04B 7/15507; H04B 7/15528; H04B 7/15592; H04W 52/146; H04W 52/46;
(Continued)

(56) References Cited

U.S. PATENT DOCUMENTS 9,652,955 B1   5/2017   Ray et al.
10,326,518 B1 *  6/2019   Magley .............. H04B 7/15528
(Continued)

FOREIGN PATENT DOCUMENTS

WO   2014138523 A1   9/2014
WO   2016083764 A1   6/2016

OTHER PUBLICATIONS

Barrachina et al., "Multi-hop Communication in the Uplink for LPWANs", Sep. 4, 2017, arxiv, arXiv:1611.08703, https://arxiv.org/abs/1611.08703, pp. 1-29 (Year: 2017).*
(Continued)

*Primary Examiner* — Christine Ng
(74) *Attorney, Agent, or Firm* — Kligler & Associates Patent Attorneys Ltd

(57) ABSTRACT

A relaying module (68) includes a radio interface (88) and a processor (84). The radio interface is configured to wirelessly receive uplink messages originating in a wireless device (24) that communicates messages with a Base Station (BS) (32) in a communication network (20), and wirelessly transmit repeated uplink messages of at least some of the received uplink messages toward the BS. The processor is configured to hold one or more transmission constraints that define limitations of using network resources for wireless transmissions in the communication network, to receive one (Continued)

or more uplink messages from the wireless device, to select at least some of the received uplink messages for repeated transmission, to allocate to the selected uplink messages respective network resources so as to maximize performance of the communication network under the transmission constraints, and to transmit the selected messages as repeated messages toward the BS, in accordance with the allocated network resources.

30 Claims, 6 Drawing Sheets

(51) Int. Cl.
  *H04W 72/12* (2009.01)
  *H04W 16/26* (2009.01)
  *H04W 52/14* (2009.01)
  *H04W 72/04* (2009.01)
  *H04W 72/08* (2009.01)

(52) U.S. Cl.
  CPC ......... *H04W 52/146* (2013.01); *H04W 52/24* (2013.01); *H04W 72/044* (2013.01); *H04W 72/082* (2013.01); *H04W 72/12* (2013.01); *H04W 72/1268* (2013.01)

(58) Field of Classification Search
  CPC ............. H04W 84/045; H04W 84/047; H04W 72/044; H04W 72/082; H04W 72/1263; H04W 72/1268
  See application file for complete search history.

(56) References Cited

U.S. PATENT DOCUMENTS

| | | |
|---|---|---|
| 2006/0003703 A1 | 1/2006 | Yahagi |
| 2010/0022184 A1 | 1/2010 | Koshnevis |
| 2010/0238826 A1 | 9/2010 | Borran et al. |
| 2011/0249610 A1* | 10/2011 | Ho ..................... H04W 28/06 370/315 |
| 2012/0135777 A1 | 5/2012 | Karpoor et al. |
| 2012/0201190 A1 | 8/2012 | Sawai |
| 2013/0039259 A1 | 2/2013 | Senalalh et al. |
| 2017/0086012 A1 | 3/2017 | Jiménez et al. |
| 2017/0223603 A1 | 8/2017 | Doi |
| 2017/0331584 A1 | 11/2017 | Visoz |

OTHER PUBLICATIONS

International Application # PCT/IB2018/056727 search report dated Jan. 30, 2019.
International Application # PCT/IB2018/056729 search report dated Jan. 27, 2019.
International Telecommunication Union (ITU) Radio Regulations Articles, pp. 1-442, Edition of 2016.
Raza et al., "Low Power Wide Area Networks: An Overview", IEEE Communications Surveys & Tutorials, vol. 19, issue 2, pp. 855-873, year 2017.
Peleg et al., U.S. Appl. No. 16/636,645, filed Feb. 5, 2020.
U.S. Appl. No. 16/636,645 Office Action dated Nov. 17, 2020.
De et al., "Technical Report—Communication Technologies in M2M/IoT Domain—TEC-TR-IoT-M2M-008-01", Communication Technologies Working Group, Ministry of Communications, Government of India, pp. 1-140, Jul. 2017.
EP Application # 18858522.8 Search Report dated May 3, 2021.
EP Application # 18857757.1 Search Report dated May 3, 2021.

* cited by examiner

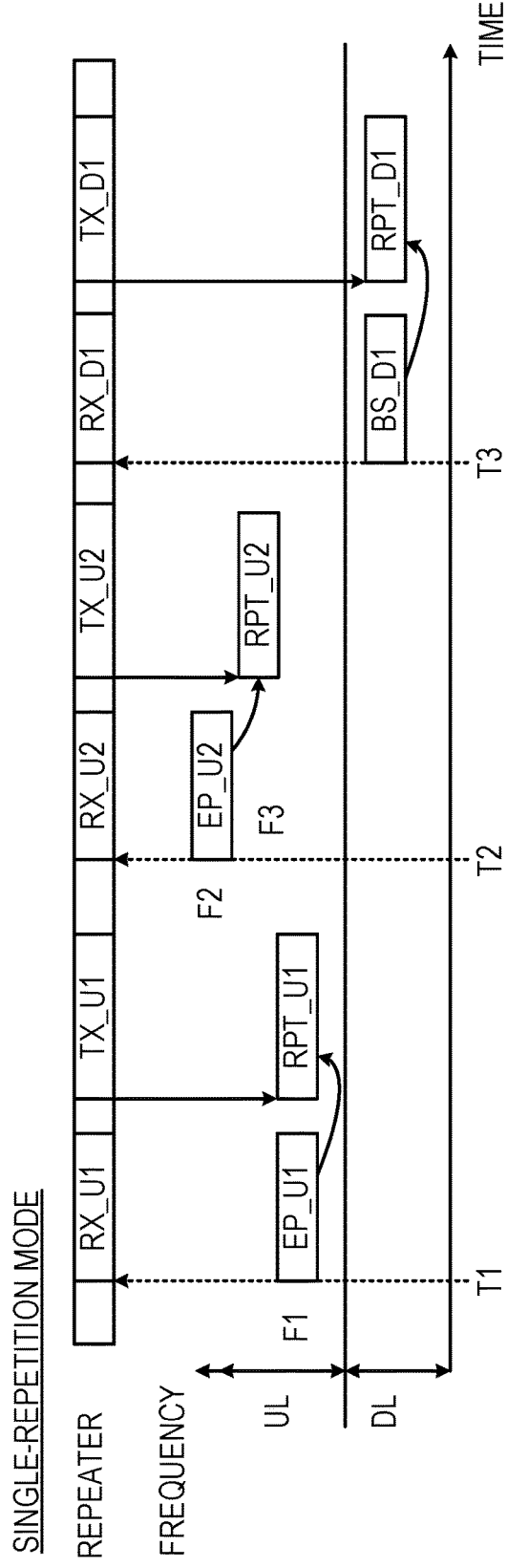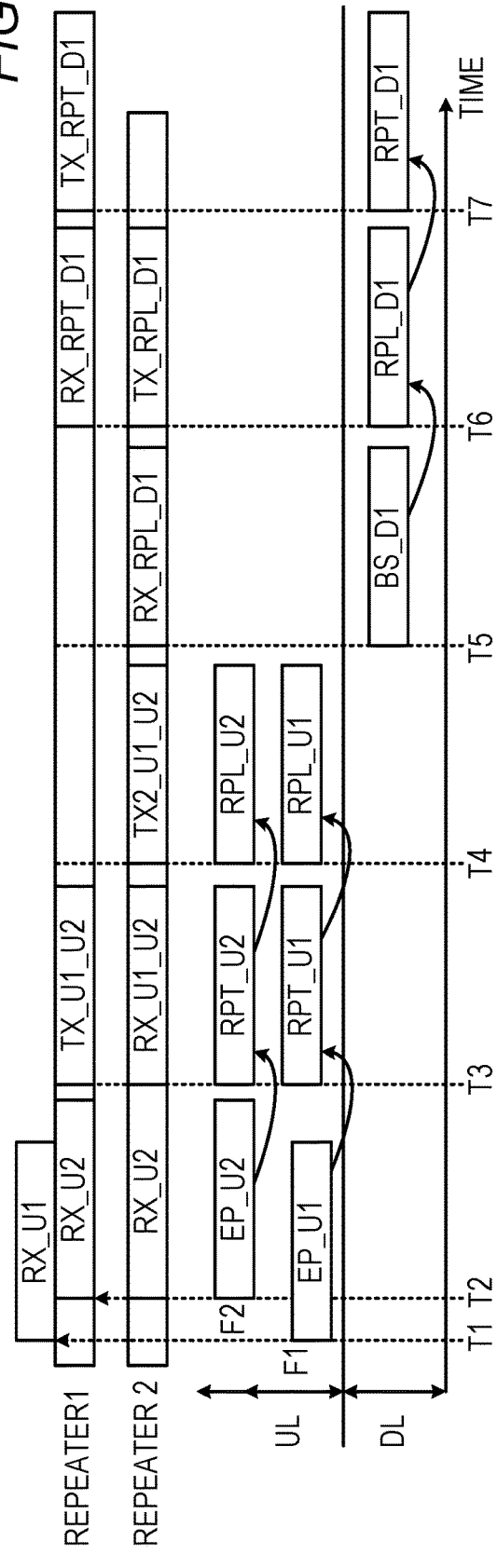

MAXIMIZING PERFORMANCE IN EXTENDED-COVERAGE WIRELESS COMMUNICATION NETWORK UNDER TRANSMISSION CONSTRAINTS

CROSS-REFERENCE TO RELATED APPLICATIONS

This application claims the benefit of U.S. Provisional Patent Application 62/681,111, filed Jun. 6, 2018, and U.S. Provisional Patent Application 62/562,513, filed Sep. 25, 2017, whose disclosures are incorporated herein by reference.

TECHNICAL FIELD

Embodiments described herein relate generally to communication networks, and particularly to methods and systems for maximizing the performance of an extended-coverage wireless network under transmission constraints.

BACKGROUND

A Low Power Wide-Area Network (LPWAN) is a wireless communication network that provides connectivity for low power wireless devices over large geographical areas. A survey of LPWAN technologies can be found, for example, in "Low Power Wide Area Networks: An Overview," IEEE Communications Surveys & Tutorials, volume 19, issue 2, 2017.

LPWANs can be used, for example, for connecting Internet of Things (IoT) and other wireless devices to the Internet, e.g., over an Industrial, Scientific and Medical (ISM) radio band. The frequency allocation of ISM bands is specified, for example, in Article 5 of the "ITU Radio Regulations Articles," edition of 2016.

LPWAN technologies and vendors include, for example, Sigfox, LoRa, Narrowband IoT (NB-IoT), LTE-M—the abbreviation for LTE Cat-M1 or Long Term Evolution (LTE) category M1, Weightless, NWave, Ingenu—formerly known as On-Ramp Wireless that provides the Random Phase Multiple Access (RPMA) technology, and the DASH7 Alliance (D7A) protocol, to name only a few.

SUMMARY

An embodiment that is described herein provides a relaying module that includes a radio interface and a processor. The radio interface is configured to wirelessly receive uplink messages originating in a wireless device that communicates messages with a Base Station (BS) in a communication network, and wirelessly transmit repeated uplink messages of at least some of the received uplink messages toward the BS. The processor is configured to hold one or more transmission constraints that define limitations of using network resources for wireless transmissions in the communication network, to receive one or more uplink messages from the wireless device, to select at least some of the received uplink messages for repeated transmission, to allocate to the selected uplink messages respective network resources so as to maximize performance of the communication network under the transmission constraints, and to transmit the selected messages as repeated messages toward the BS, in accordance with the allocated network resources.

In some embodiments, the radio interface is configured to receive the uplink messages directly from a wireless device, or indirectly via another relaying module. In other embodiments, the radio interface is configured to transmit the selected messages directly to the BS, or indirectly via another relaying module. In yet other embodiments, the processor is configured to allocate the network resources by selecting for a given uplink message at least one of: a time resource, a frequency resource, transmission power and an identity of one or more target BSs.

In an embodiment, the processor is configured to receive multiple copies of a same uplink message, the multiple copies originate from a wireless device, and to filter the copies by transmitting toward the BS a partial subset of the multiple copies. In another embodiment, the processor is configured to reduce an amount of information transmitted over the air, by applying to the selected uplink messages a predefined data compression coding scheme. In yet another embodiment, the processor is configured to receive multiple messages that were transmitted by respective wireless devices using different respective narrowband carriers, to group the multiple narrowband carriers into a common frequency channel, and to schedule transmission of the multiple messages during a subsequent transmission time slot using the common frequency channel.

In some embodiments, the radio interface is further configured to receive from the BS a downlink transmission at a given downlink frequency, the downlink transmission was initiated by the BS in response to receiving from the relaying module an uplink re-transmission at a given uplink frequency that depends on an identity of the relaying module, and the processor is configured to schedule re-transmission of the downlink message in response to verifying that a difference between the given uplink frequency and the given downlink frequency equals a predefined frequency-offset. In other embodiments, the radio interface is further configured to receive from the BS multiple downlink messages, and the processor is configured to identify, based on the downlink messages, one or more wireless devices for which the processor avoids re-transmitting uplink and downlink messages. In yet other embodiments, the processor is configured to estimate a metric that is indicative of a reception quality over one or more uplink messages received via the radio interface, and to report the estimated metric by transmitting a dedicated metadata message containing at least the metric.

In an embodiment, the processor is configured to sense for activity in an uplink frequency band allocated for uplink transmissions, and after verifying that no uplink transmissions are active, to transmit a repeated uplink message toward the BS. In another embodiment, the processor is configured to transmit a repeated message to another relaying module over a dedicated link, by identifying in the dedicated link one or more noisy frequencies, and splitting a transmission of the repeated message over one or more frequencies of the dedicated link, other than the noisy frequencies. In yet another embodiment, the processor is configured to identify that a given uplink message received, was previously received in the relaying module and transmitted by the processor as a repeated message, and to refrain from scheduling a repeated transmission of the given uplink message.

In some embodiments, the processor is further configured to transmit to the BS multiple uplink test messages, each uplink test message includes a repeated uplink message or a random uplink message, and the uplink test messages are transmitted at respective known transmission power levels, to receive from the BS, in one or more downlink messages, information that is indicative of reception quality levels of the uplink test messages by the BS, and to determine, based on the information received from the BS and on the known transmission power levels of the uplink test messages, a minimal transmission power level for transmitting subsequent repeated uplink messages to the BS.

There is additionally provided, in accordance with an embodiment that is described herein a method, including, in a relaying module, wirelessly receiving uplink messages originating in a wireless device that communicates messages with a Base Station (BS) in a communication network, and wirelessly transmitting repeated uplink messages of at least some of the received uplink messages toward the BS. One or more transmission constraints that define limitations of using network resources for wireless transmissions in the communication network are held. One or more uplink messages are received from the wireless device. At least some of the received uplink messages are selected for repeated transmission. Respective network resources are allocated to the selected uplink messages so as to maximize performance of the communication network under the transmission constraints. The selected messages are transmitted as repeated messages toward the BS, in accordance with the allocated network resources.

These and other embodiments will be more fully understood from the following detailed description of the embodiments thereof, taken together with the drawings in which:

BRIEF DESCRIPTION OF THE DRAWINGS

FIG. 3 is a diagram that schematically illustrates uplink and downlink message flow using a single-repetition mode, in accordance with an embodiment that is described herein;

FIG. 4 is a diagram that schematically illustrates uplink and downlink message flows using a multi-repetition mode, in accordance with an embodiment that is described herein;

DETAILED DESCRIPTION OF EMBODIMENTS

Overview

Figure 1:
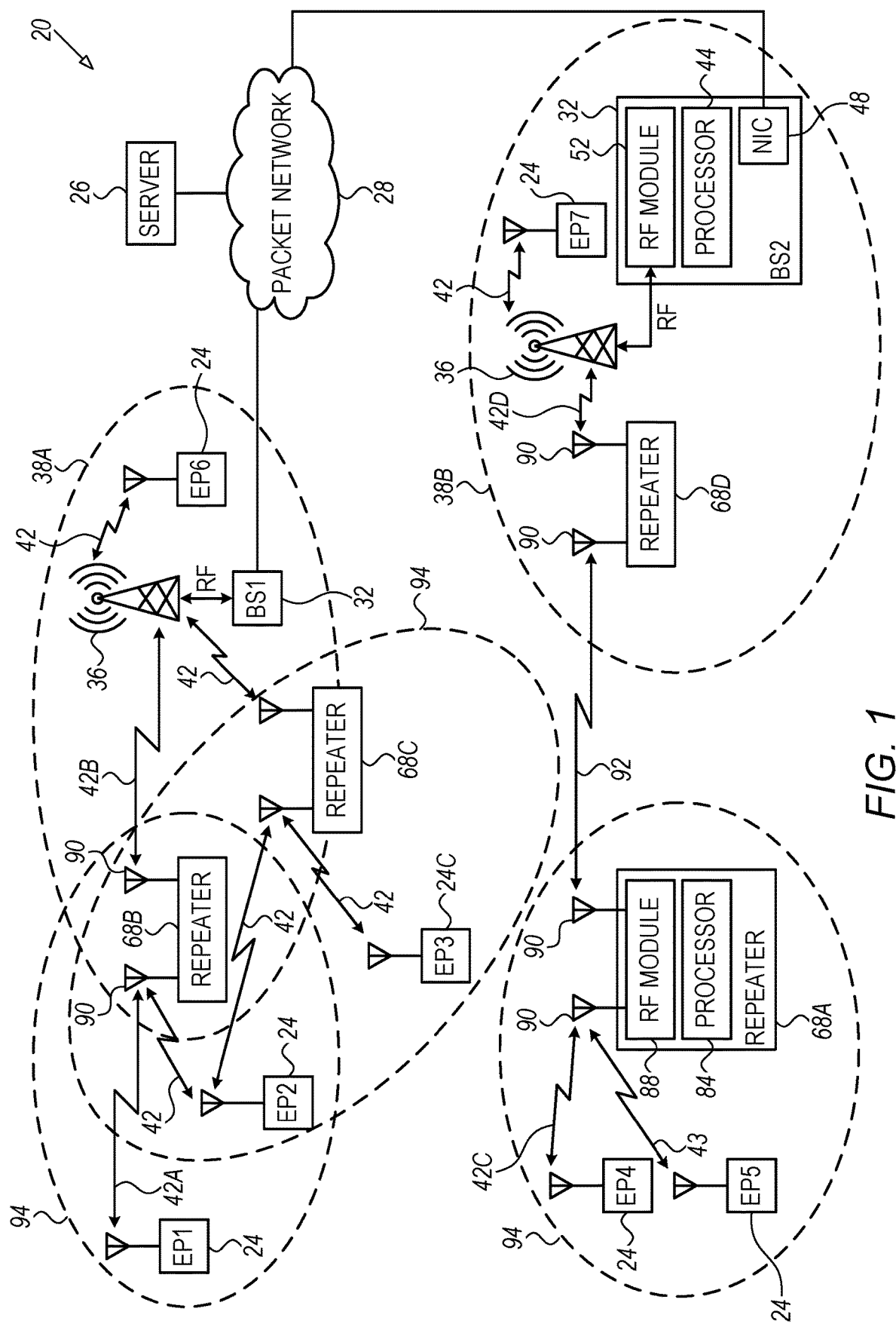
FIG. 1 is a block diagram that schematically illustrates a Low Power Wide Area Network (LPWAN) with extended coverage, in accordance with an embodiment that is described herein.

Low Power Wide-Area Networks (LPWANs) are designed to provide connectivity for low-power, low-cost and low-throughput wireless devices operating on battery power. LPWANs typically support a range of several kilometers and battery life of several years. Devices suitable for connecting to a LPWAN may comprise, for example, Internet of Things (IoT) or Machine-to-Machine (M2M) devices. For reliable communication and long battery life, a LPWAN typically operates at a low data rate on the order of 100 bits per second up to tens of kilobits per second.

The wireless devices in a LPWAN are also referred to herein as End Point (EP) devices or simply "EPs" for brevity. The LPWAN comprises gateways or Base Stations (BSs), which mediate between wireless EPs located within their coverage area and a central packet network or cloud, e.g., the Internet. The EPs typically communicate over the LPWAN with one or more remote servers such as, for example, a Network and Application Server (NAS) or any other suitable type of server.

The communication between the BSs and EPs over the air may have limited reliability, for example, when lacking line of sight to the BS, or in areas vulnerable to noise and interference. In principle, the LPWAN coverage can be extended by deploying additional BSs, but this approach is costly, and increases traffic volume and overall complexity.

Embodiments that are described herein provide improved systems and methods for extending the coverage of a LPWAN. In the disclosed techniques, the LPWAN comprises an extension network comprising relaying modules that communicate wirelessly with EPs, BSs and with one another. The relaying modules extend the LPWAN coverage, and manage traffic flow so as to maximize the LPWAN performance under various constraints imposed, for example, by RF regulation and due to limited network resources.

In the context of the present disclosure, the term "relaying module" refers to a module in the extended LPWAN that wirelessly mediated between BSs and EPs located outside the coverage areas of the BSs. The relaying module is also referred to herein as a repeater. In the description that follows that terms "relaying module" and "repeater" are used interchangeably.

In order to provide high performance while meeting the constraints, the relaying modules apply various techniques, such as efficiently using time and frequency resources of the LPWAN, adjusting transmission power and scheduling transmissions for reducing interference. The relaying modules mediate between remote EPs and BSs, and emulate for the BSs EP communication. Emulating EP transmissions includes providing geolocation information of the EPs. Relaying modules can be easily and flexibly incorporated into an existing LPWAN for extending its coverage, and accommodating varying needs in the network, such as supporting evolving standards and protocols.

In some embodiments, a relaying module receives, via a radio interface, uplink messages originating in EPs and downlink messages originating in a BS. The relaying module further comprises a processor that recovers the uplink and downlink messages received, and transmits repeated uplink messages toward the BS, and repeated downlink messages toward the EPs.

In some embodiments, the processor holds one or more transmission constraints that define limitations of using network resources for wireless transmissions in the communication network. The processor plans a scheduling scheme, by allocating network resources to uplink downlink messages that were selected to be repeated, so as to maximize performance of the communication network under the transmission constraints, and transmits the repeated uplink and downlink messages in accordance with the scheduling scheme.

In some embodiments, the relaying module comprises a repeater. EPs communicate wirelessly with the repeaters, and BSs communicate wirelessly with the repeaters. In addition, the repeaters communicate with one another over the same link that EPs use for communicating with BSs or over another dedicated wireless link. EP uplink transmissions are intercepted by one or more repeaters, or directly by a BS. BS downlink transmissions are intercepted directly by one or more EPs or by one or more repeaters.

The extension network may support several operating modes, such as: (i) a single-repetition mode in which a repeater communicates wirelessly with one or more target BSs, and (ii) a multi-repetition mode in which a repeater communicates wirelessly with another repeater over the dedicated wireless link, and that repeater communicates wirelessly with the target BS.

In some embodiments, the processor of the relaying module allocates network resources for repeated transmission by selecting for a given uplink or downlink message at least one of: a time resource, a frequency resource, transmission power and an identity of one or more target BSs or target EPs. Note that by allocating specific resources of time, frequency and transmission power, in a predefined pattern, that pattern itself conveys information, such as the ID of the relaying module that allocated resources in that pattern. Producing information in this manner does not require explicit addition of any information to the messages, and does not require modifying the underlying protocols.

The relaying module schedules re-transmissions of uplink and downlink messages so as to improve the performance of the communication network in various ways. In one embodiment, the relaying module receives from an EP multiple copies of a same uplink message, which the EP transmits for redundancy. To reduce traffic load and interference, the processor filters the copies by transmitting toward the BS a partial subset of the multiple copies. In an embodiment, the processor estimates the quality of the wireless channel, and omits redundant copies when the channel quality is sufficiently high.

In some embodiments, the LPWAN operates under regulatory constraints. For example, in accordance with the Federal Communications Commission (FCC) regulations, a 200 KHz uplink band is divided into 25 KHz channels that each carries up to 41 600 Hz narrowband carriers. In addition, a channel can be allocated for transmission over a 400 ms period in every 2.5-second time slot. In an embodiment, the relaying module receives multiple messages that were transmitted by respective EPs using different respective narrowband carriers. The processor groups the multiple narrowband carriers into a common channel, and schedules transmission of the multiple messages during a subsequent 400 ms time slot using the common channel. The processor additionally adjusts the transmission power of the narrowband carriers to meet FCC power limitations and limit noise level based on BS proximity.

A downlink message originating by a BS is typically destined to a specific EP or to a small number of EPs. Repetition of downlink messages by a large number of relaying modules may undesirably flood the communication network and cause interference. In some embodiments, the relaying modules reduce downlink traffic by selectively re-transmitting downlink messages. In such embodiments, a relaying module is preconfigured with a frequency-offset between an uplink transmission initiated by the relaying module and a response downlink transmission initiated by the target BS. The relaying module thus re-transmits a response downlink message received from the BS only when the actual frequency-offset matches the preconfigured frequency-offset of the UL repeated transmission.

Re-transmitting messages by the relaying modules may interfere with receiving EP uplink messages and BS downlink messages. In some embodiments, to avoid interference, the relaying module senses the activity over the uplink and downlink bands, and defers transmission to periods during which these bands are free. When operating in full-duplex, the relaying module separates between transmission and reception paths, e.g., by applying echo cancelation and/or isolation techniques.

System Description

FIG. 1 is a block diagram that schematically illustrates a Low Power Wide Area Network (LPWAN) 20 with extended coverage, in accordance with an embodiment that is described herein. The LPWAN of FIG. 1 provides two-way connectivity between wireless End-Point (EP) devices 24 and a packet network 28.

LPWAN 20 can be used in various applications that require long range access for a large number of low-cost low-power wireless devices, such as, for example, smart cities, home automation, logistics, environmental monitoring, remote metering and control, and the like.

EPs 24 may comprise, for example, an Internet of Things (IoT) metering or other devices that exchange short messages with servers coupled to packet network 28, such as a Network and Application Server (NAS) 26. Alternatively, other suitable types of server 26 can also be used. Packet network 28 comprises a packet network or cloud, operating in accordance with any suitable protocols. Packet network 28 may comprise, for example, an IP network such as the Internet, or an Ethernet network.

In LPWAN 20 of FIG. 1, EP 24 comprises a wireless device, usually operating on battery power. For maximal battery life, EP 24 typically transmits short messages at low power. The EP transmissions are typically restricted to meet various constraints defined by regulatory bodies such as the Federal Communications Commission (FCC) and the European Telecommunications Standards Institute (ETSI), as will be described below. For reliable communication over long ranges, the EPs typically communicate messages over the air at a low bitrate, e.g., 50 Kbit per second or lower. In some standards, the transmission duty cycle of EPs is restricted, e.g., to 1% or to a given number of messages per day.

LPWAN 20 comprises Base Stations (BSs) 32, which communicate wirelessly with EPs 24 and are coupled to packet network 28. BS 32 communicates messages modulated in Radio Frequency (RF) signals, using a suitable modulation scheme, via an antenna (or antenna tower) 36, with EPs located in some respective coverage area 38 of the BS. In some embodiments, BS 32 and EP 24 communicate with one another using a suitable modulation technique.

A coverage area of a BS includes geographical locations at which EPs communicate reliably with that BS. A BS cannot communicate directly, via antenna 36, with any EP located outside its coverage area, i.e., the overall coverage region supported wirelessly by the BSs alone is typically limited. In the example of FIG. 1, BS 32 denoted BS1 communicates directly with an EP 24 denoted EP6, which resides within coverage area 38A of BS1. Similarly, BS 32 denoted BS2 communicates directly with an EP 24 denoted EP7 that resides within coverage area 38B of BS2.

In FIG. 1, EPs 24 communicate with BSs 32 over a wireless link 42, also referred to as an EP-BS link 42, which is typically specified within suitable protocols that define parameters such as transmission power, bit-rate, modulation techniques, and transmission scheduling. EP-BS link 42 additionally specifies messaging parameters such as message format and length and redundancy information attached to the message, if any. The redundancy information can be used for various purposes such as error correction and security, in an embodiment.

The transmission direction from the EPs toward the BSs is referred to as uplink (UL), and the transmission direction from the BSs toward the EPs is referred to as downlink (DL).

In an example embodiment, LPWAN 20 may be based on the "Sigfox" network, in which case EP-BS link 42 uses the Ultra Narrow Band (UNB) modulation band, wherein each message occupies a frequency band of 100 Hz or 600 Hz and transferred at a data rate of 100 or 600 bits per second, depending on the region. An uplink Sigfox frame comprises 26 bytes or less, of which the payload part comprises up to 12 bytes.

In some embodiments, EPs 24 are not pre-associated with specific BSs, but are configured to broadcast uplink messages that may be intercepted by one or more BSs, which monitor the relevant radio spectrum for EP transmissions.

As depicted in the detailed block diagram of BS2, the BS comprises a processor 44, a Network Interface Controller (NIC) 48 and a RF module 52. Processor 44 carries out the various communication and management tasks of the BS. NIC 48 handles packet communication between the BS and packet network 28, in accordance with the underlying network protocols. RF module 52 comprises a RF transmitter and a RF receiver (not shown) for transmitting and receiving RF signals to and from EPs 24 via antenna 36 over EP-BS link 42. As will be described in detail below, the BSs also communicate wirelessly over EP-BS link 42 with relaying modules that are used for extending the coverage of the LPWAN.

In practical deployments, one or more of EPs 24 may not belong to the coverage area of any of BSs 32. Areas that may be difficult to cover wirelessly include, for example, underground areas such as a subway station or a basement, the inside of or areas hidden by buildings, and varying terrains. In some embodiments, LPWAN 20 extends the coverage area of the BSs, using an extension network comprising one or more relaying modules, also referred to as repeaters 68. The relaying modules enable reliable communication between the BSs and remote EPs residing outside the coverage area of the BSs, thus providing coverage to remote and difficult areas that cannot be covered by the BSs alone.

As depicted in the block diagram of repeater 68A, the repeater comprises a processor 84, a RF module 88 and one or more antennas 90. Processor 84 handles the various functions of the repeater, as will be described in detail below. RF module 88 comprises a RF transmitter and a RF receiver (not shown). The RF transmitter and receiver of the repeater support exchanging RF signals with EPs 24, with BSs 32 and with other repeaters 68. The repeater communicates over EP-BS links 42 with one or more BSs 32, and over links 92 with one or more other repeaters 68. For example, repeaters 68A and 68D communicate with one another over link 92. Link 92 may comprise a dedicated or proprietary wireless link.

In some embodiments, the receiver part of RF module 88 supports receiving uplink messages from EPs over EP-BS link 42 and from other repeaters over wireless link 92. The receiver part of RF module 88 supports receiving downlink messages from the BSs over EP-BS link 42 and from other repeaters over link 92. The transmitter part of RF module 88 transmits repeated uplink messages to the BSs over EP-BS link 42 and repeated downlink messages to other repeaters 68 over link 92. The transmitter part of RF module 88 transmits repeated downlink messages to EPs over EP-BS link 42 and over link 92 to other repeaters. The transmitter and receiver of RF module 88 respectively modulate and demodulate messages into RF signals in accordance with the wireless protocols of EP-BS link 42 and link 92.

In some embodiments, the repeater communicates with EPs 24 in accordance with the protocols specified for EP-BS link 42, and with other repeaters in accordance with link 92 or EP-BS link 42. The repeater coverage area for communicating with EPs is depicted as region 94.

In some embodiments, instead of, or in addition to using EP-BS link 42, the repeater supports communicating wirelessly with EPs using a different wireless link such as wireless link 43. In the example of FIG. 1, repeater 68A communicates with EP4 using the EP-BS link 42 and with EP5 using wireless link 43. In an embodiment, a given repeater communicates with EPs and BS using different respective wireless links. In the example of FIG. 1, repeater 68C communicates with EP3 and with BS1 over EP-BS link 42. The repeater converts between the message formats and underlying protocols of the different wireless links or frequencies.

In some embodiments, wireless link 43 is the same as the EP-BS link 42. In other embodiments, wireless link 43 comprises a different version of the protocol suite specifying EP-BS link 42. In yet other embodiments, EP-BS link 42 and wireless link 43 specify different respective protocol suites in accordance with a different respective standard, e.g., Sigfox and LoRa. Processor 84 of the repeater mediates between the different protocols specified for EP-BS link 42 and wireless link 43.

In LPWAN 20, an EP can communicate with a BS in various ways. When residing within the coverage area of the BS, the EP communicates directly with the BS over EP-BS link 42. Note that in cases in which an EP is covered by both the relaying module and BS, the relaying module should not re-transmit uplink and downlink messages from and to the EP. When the EP is outside the coverage area of the BS, the EP can communicate with the BS via one or more relaying modules such as repeater 68.

In a "single-repetition mode" of operation, the EP communicates with a remote BS via a single repeater. For example, repeater 68B enables communication between BS1 and the EPs denoted EP1 and EP2, in a single-repetition mode. In a "multi-repetition mode" of operation, the EP communicates with the BS via two or more repeaters. In the example of FIG. 1, repeater 68A and repeater 68D enable communication between BS2 and the EPS denoted EP4 and EP5 in a multi-repetition mode. The multi-repetition mode can also be implemented using a chain of two or more repeaters via traditional link or dedicated links.

In some embodiments, an EP uplink message flowing through the extension network is re-formatted, e.g., by processor 84 of a repeater 68. The processor converts the message from a source format of the EP to a destination format of the BS. In an embodiment, processor 84 of a repeater adds to the received uplink message information regarding the reception quality at the repeater. Such information may be used for emulating to the BS a suitable metric such as Signal to Noise Ratio (SNR), Time of Arrival (ToA), and/or Received Signal Strength Indicator (RSSI).

In some embodiments, one or more of repeaters 68 are implemented using a conventional mobile terminal such as a cellular phone or smartphone. In such embodiments, the mobile terminal runs an application program that implements the functionality of the repeater. For example, two mobile phones serving as repeaters are interconnected via the cellular network (e.g., instead of using link 92.) These two mobile phones further communicate over EP-BS link 42 with elements of the LPWAN such as EPs, BSs and other relaying modules.

The configurations of LPWAN 20 and repeater 68 in FIG. 1 are chosen purely for the sake of conceptual clarity. In alternative embodiments, any other suitable LPWAN and repeater configurations can also be used.

The different elements of repeater 68 may be implemented using suitable hardware, such as in one or more Application-Specific Integrated Circuits (ASICs) or Field-Programmable Gate Arrays (FPGAs).

In some embodiments, some elements of repeater 68, e.g., processor 84 can be implemented using software, or using a combination of hardware and software elements. Elements of repeater 68 that are not mandatory for understanding of the disclosed techniques have been omitted from the figure for the sake of clarity.

In some embodiments, some or all of the functions of processor 84, may be implemented in a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Managing Message Re-Transmission in Relaying Modules

Figure 2:
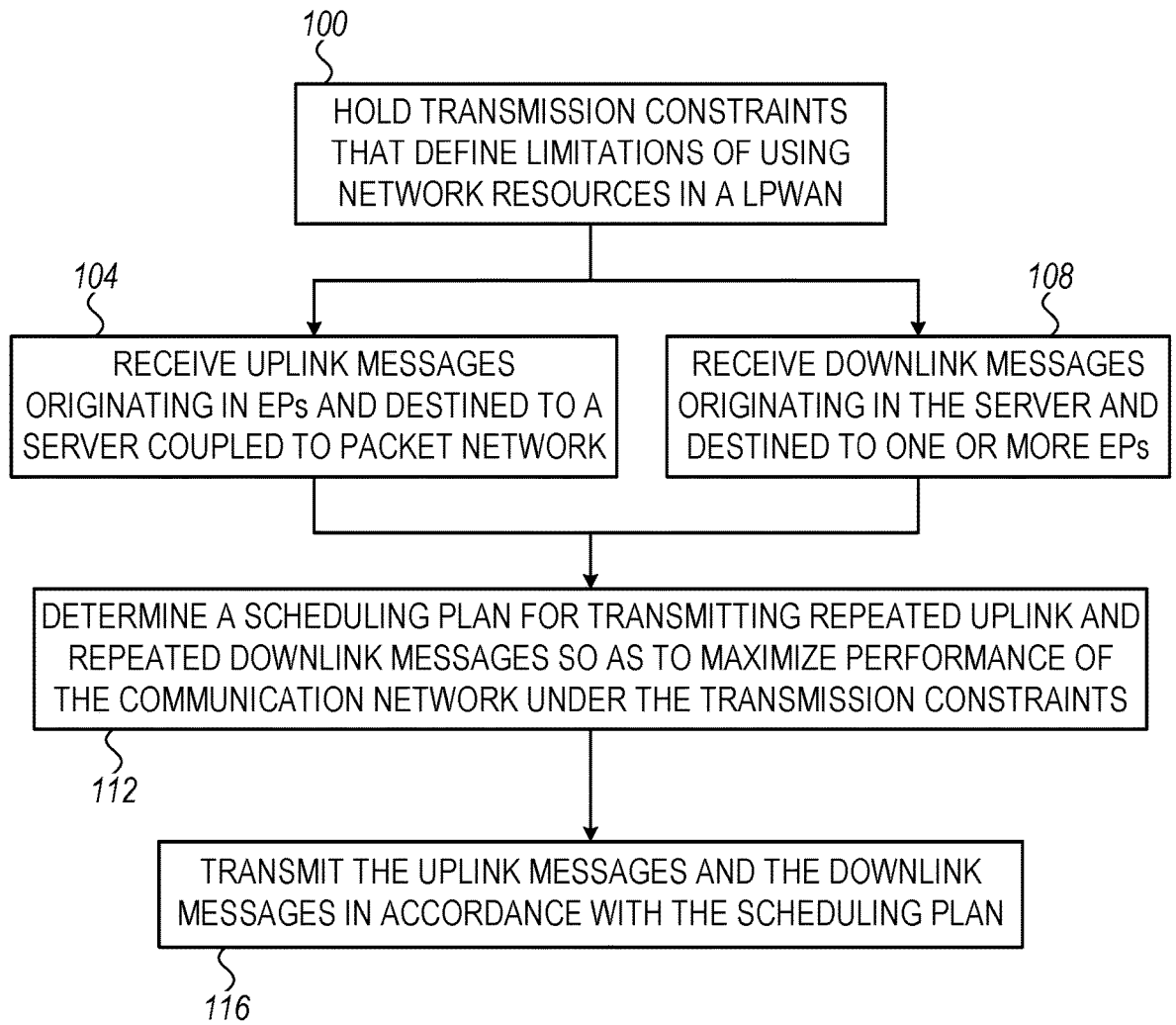
FIG. 2 is a flow chart that schematically illustrates a method for re-transmission of messages by relaying modules for extending the coverage of a LPWAN, in accordance with an embodiment that is described herein.

FIG. 2 is a flow chart that schematically illustrates a method for re-transmission of messages by relaying modules for extending the coverage of LPWAN 20, in accordance with an embodiment that is described herein.

The method of FIG. 2 can be executed by processor 84 of repeater 68. In the context of the present disclosure, repeater 68 is referred to as a "relaying module." Thus, the term "processor of the relaying module" or simply "the processor," for brevity, refers to processor 84.

The method begins with the processor of the relaying module holding transmission constraints that define limitations of using network resources in the LPWAN, at a constraints definition step 100. In some embodiments, the transmission constraints define the transmission limitations in terms of using time-frequency resources, transmission power, transmission scheduling and the like. In some embodiments, the transmission constraints comprise regulatory constraints that are specified by some regulatory authority such as the Federal Communications Commission (FCC) or the European Telecommunications Standards Institute (ETSI).

At an uplink reception step 104, the processor receives uplink messages originating in EPs 24 and destined to NAS 26 via a BS 32 over packet network 28. In an embodiment, the processor receives uplink messages from an EP over EP-BS link 42 or wireless link 43, or repeated uplink messages from another repeater over EP-BS link 42 or wireless link 43. In another embodiment, the processor receives repeated uplink messages over link 92.

At a downlink reception step 108, the processor receives from BS 32 downlink messages (e.g., originating in NAS 26) and destined to one or more EPs 24. In an embodiment, the processor receives the downlink messages from the BS over EP-BS link 42. In another embodiment, the processor receives repeated downlink messages from another repeater over EP-BS link 42 or over link 92.

In a typical implementation, the processor supports receiving uplink and downlink messages, as well as repeated uplink and downlink messages simultaneously. In such embodiments, the processor executes steps 104 and 108 in parallel.

At a scheduling determination step 112, the processor determines a scheduling plan for transmitting repeated uplink messages toward the EPs and for transmitting repeated downlink messages toward the BSs. The processor determines the scheduling plan so as to maximize the performance of the LPWAN under the transmission constraints of step 100. Example scheduling plans are described in detail further below.

A repeater that receives an uplink or downlink message (or a repeated uplink or downlink message) over the air, demodulates the received message using respective RF module 88, and processor 84, to recover the message bits. The processor transmits the repeated messages as specified by the scheduling plan via the relevant RF module, which modulates the repeated messages in accordance with the modulation scheme of EP-BS link 42 or link 92, as required.

At a forwarding step 116, the processor transmits uplink and downlink messages, in accordance with the scheduling plan of step 112. Following step 116, the method terminates.

In some embodiments, the processor modifies a received uplink message to produce the respective repeated uplink message. Similarly, the processor may modify a received downlink message in producing a respective repeated downlink message. The processor may modify a message, for example, by modifying the message content, by adding information to the message, or both. The processor applies message modification, e.g., at step 112 as part of determining the scheduling plan, in an embodiment. The processor modifies the uplink or downlink message, for example, to convert between the protocols and formats supported over EP-BS link 42 and wireless link 43.

Message Flow in LPWAN with Extended Coverage

Extending the coverage in a network such as LPWAN 20 can be handled in various ways. The main modes of operation supported by LPWAN 20 include (i) single-repetition mode and (ii) multi-repetition mode, as described below.

FIG. 3 is a diagram that schematically illustrates uplink and downlink message flow using a single-repetition mode, in accordance with an embodiment that is described herein. In describing FIG. 3, we assume that EP1 of FIG. 1 communicates uplink and downlink messages with BS1, via repeater 68B. In the present example, EP1 communicates with repeater 68B over EP-BS link 42A, and repeater 68B communicates with BS1 over EP-BS link 42B. In FIG. 3, different frequency bands are used for the uplink (UL) and downlink (DL) transmissions.

The lower part of the diagram depicts time-frequency resources used by EP1 and repeater 68B over EP-BS links 42A and 42B. The upper part of the diagram depicts reception and transmission activities of repeater 68B over time. In describing FIG. 3, processor 84 refers to the processor of repeater 68B.

We assume that processor 84 holds suitable transmission constraints, as explained above.

Up to time denoted T1, processor 84 scans the relevant RF spectrum for detecting EP transmissions. At time T1, EP1 starts transmitting an uplink transmission denoted EP_U1 that modulates an uplink EP message using a frequency resource denoted F1. Repeater 68B intercepts the EP_U1 transmission as denoted by the repeater activity RX_U1, and processor 84 recovers the EP message from the intercepted transmission. The repeater transmits the recovered EP message (denoted RPT_U1) over the air to BS1 over EP-BS link 42B, as indicated by the repeater activity TX_U1. Processor 84 schedules the transmission of the EP message to BS1 so as to maximize the network performance under the transmission constraints. In the present example, processor 84 selects for the repeated uplink message RPT_U1 the same frequency resource F1 of the uplink message transmitted by EP1.

Processor 84 scans the RF spectrum continuously for EP transmissions and potentially can receive and decode multiple concurrent uplink transmissions from EPs, such as EP_U1.

A similar message flow applies to the uplink transmission denoted EP_U2 starting and T2. In this example, however, EP1 (or another EP) transmits the uplink message EP_U2 using a frequency resource denoted F2, whereas processor 84 of the repeater selects for the repeated message RTP_U2 of EP_U2, a frequency resource denoted F3, wherein F3 is different from F2.

At time T3, BS1 starts transmitting a downlink message denoted BS_D1 over EP-BS Link 42B. Processor 84 intercepts this downlink transmission as indicated by repeater activity RX D1. Processor 84 demodulates the downlink message of BS_D1, and schedules a transmission of a corresponding repeated downlink message. The repeated downlink transmission is targeted to one or more EPs within the coverage area of repeater 68B, such as EP1 and EP2. Processor 84 transmits the repeated downlink message RPT_D1 of BS_D1, as indicated by repeater activity TX_D1. Processor 84 schedules the RPT_D1 transmission so as to maximize the network performance under the transmission constraints.

FIG. 4 is a diagram that schematically illustrates uplink and downlink message flows using a multi-repetition mode, in accordance with an embodiment that is described herein. In the example of FIG. 4, EP4 and EP5 communicate with BS2 via a chain of two repeaters 68A and 68D. Specifically, EP4 and EP5 communicate with repeater 68A over EP-BS link 42C and wireless link 43, respectively, repeater 68A communicates with repeater 68D over link 92, and repeater 68D communicates wirelessly with BS2 over EP-BS link 42D.

The lower part of the diagram depicts time-frequency resource usage by EP4 and repeater 68A over EP-BS link 42C, by repeater 68A and repeater 68D over link 92, and by repeater 68D and BS2 over EP-BS link 42D. In the present example, different frequency bands are used for the uplink and downlink transmissions, and both EP-BS link 42 and wireless link 43 share the same uplink and downlink frequency bands.

The upper part of the diagram depicts reception and transmission activities of repeater 68A and repeater 68D over time. In FIG. 4, repeaters 68A and 68D are denoted REPEATER1 and REPEATER2, respectively.

In describing FIG. 4, processor 84 refers to the processors of repeaters 68A and 68D. Processor 84 of each repeater holds predefined transmission constraints, as explained above.

In FIG. 4, EP4 and EP5 respectively initiate wireless uplink transmissions denoted EP_U1 and EP_U2, at respective time instances T1 and T2, using respective frequency resource F1 and F2. Each of the EP_U1 and EP_U2 transmissions carries a respective uplink message destined to BS2. Repeater 68A intercepts the wireless uplink transmissions of EP4 over EP-BS link 42C, and uplink transmissions of EP5 over wireless link 43. Processor 84 of repeater 68A recovers from the uplink transmissions the respective uplink messages. The reception activities in intercepting the uplink transmissions by repeater 68A are denoted RX_U1 and RX_U2, respectively. Processor 84 of repeater 68A then schedules re-transmission of the uplink messages, and re-transmits the recovered uplink messages over link 92, starting at time T3. In FIG. 4, the repeated transmissions of EP_U1 and EP_U2 are denoted RPT_U1 and RTP_U2, and the corresponding repeater activity is denoted TX_U1_U2.

Repeater 68D intercepts the repeated transmissions RPT_U1 and RPT_U2, as denoted by repeater activity RX_U1_U2. Processor 84 of repeater 68D demodulates the respective repeated uplink messages carried in RPT_U1 and RPT_U2, and schedules the re-transmission of the recovered messages to BS2 over EP-BS link 42D, at time T4, as indicated by repeater activity TX2_U1_U2. In FIG. 4, RPL U1 and RPL U2 denote the respective repeated transmissions of RPT_U1 and RPT_U2 by repeater 68D.

At time T5, repeater 68D intercepts a downlink transmission BS_D1, initiated by BS2 over EP-BS link 42D, as indicated by repeater activity RX_RPL_D1. In the present example, the BS_D1 downlink transmission carries a downlink message originating by NAS 26 and destined to EP4, EP5 or both. Processor 84 of repeater 68D recovers the downlink message carried in the BS_D1 transmission, and schedules re-transmission of the downlink message to repeater 68A over link 92, at time T6, as denoted by repeater activity TX_RP_LD1. Repeater 68A intercepts the repeated downlink transmission RPL_D1 of repeater 68D as denoted by repeater activity RX_RPT_D1. Processor 84 of repeater 68A recovers the downlink message carried in the RPL_D1 transmission, and schedules re-transmission of the downlink message to the EPs at its coverage area, as indicated by repeater activity TX_RPT_D1, at time T7. The repeated downlink transmission of repeater 68A is denoted RPT_D1.

Robust and Efficient Communication with Eps

In some embodiments, an EP 24 operates in a region that is vulnerable to noise and interference. In such embodiments, the EP may communicate over EP-BS link 42 (or wireless link 43) using a robust modulation technique, e.g., having a suitable modulation constellation. Alternatively or additionally, the EP may communicate over EP-BS link 42 and/or wireless link 43 uplink and downlink messages that are protected using any suitable Forward Error Correction (FEC) method. For example, the uplink and/or downlink messages are protected by adding to the message suitable redundancy information, in accordance with any suitable Error Correction Code (ECC).

In some embodiments, EP-BS link 42 specifies for the uplink direction, transmitting an uplink message by a given EP multiple times over the air, so that in noisy environments at least one of the message copies will be intercepted correctly by the receiving party, with high probability. Note that since the EP is typically a low-complexity device, the EP has no computational resources for estimating the quality of the channel between the EP and BS, in order to avoid multi-transmission of the same message when the quality is sufficiently high.

As noted above, an EP communicates with the BS either in single-repetition mode, e.g., EP1-BS1 via repeater 68B, or in a multi-repetition mode, e.g., EP4-BS2 via repeaters 68A and 68D. In some embodiments, the processor of the relaying module that communicates wirelessly with a BS (i.e., processor 84 of repeater 68B or processor 84 of repeater 68D) has knowledge of the quality of the wireless channel between the relaying module and the BS. The processor of the relaying module is also aware of the link budget available. In such embodiments, when the channel quality is sufficiently high, e.g., compared to a predefined threshold quality level, the processor of the relaying module re-transmits a reduced-power messages and/or partial subset of the multiple EP transmissions, i.e., omits at least one (but not all) of the multiple message copies.

Figure 5:
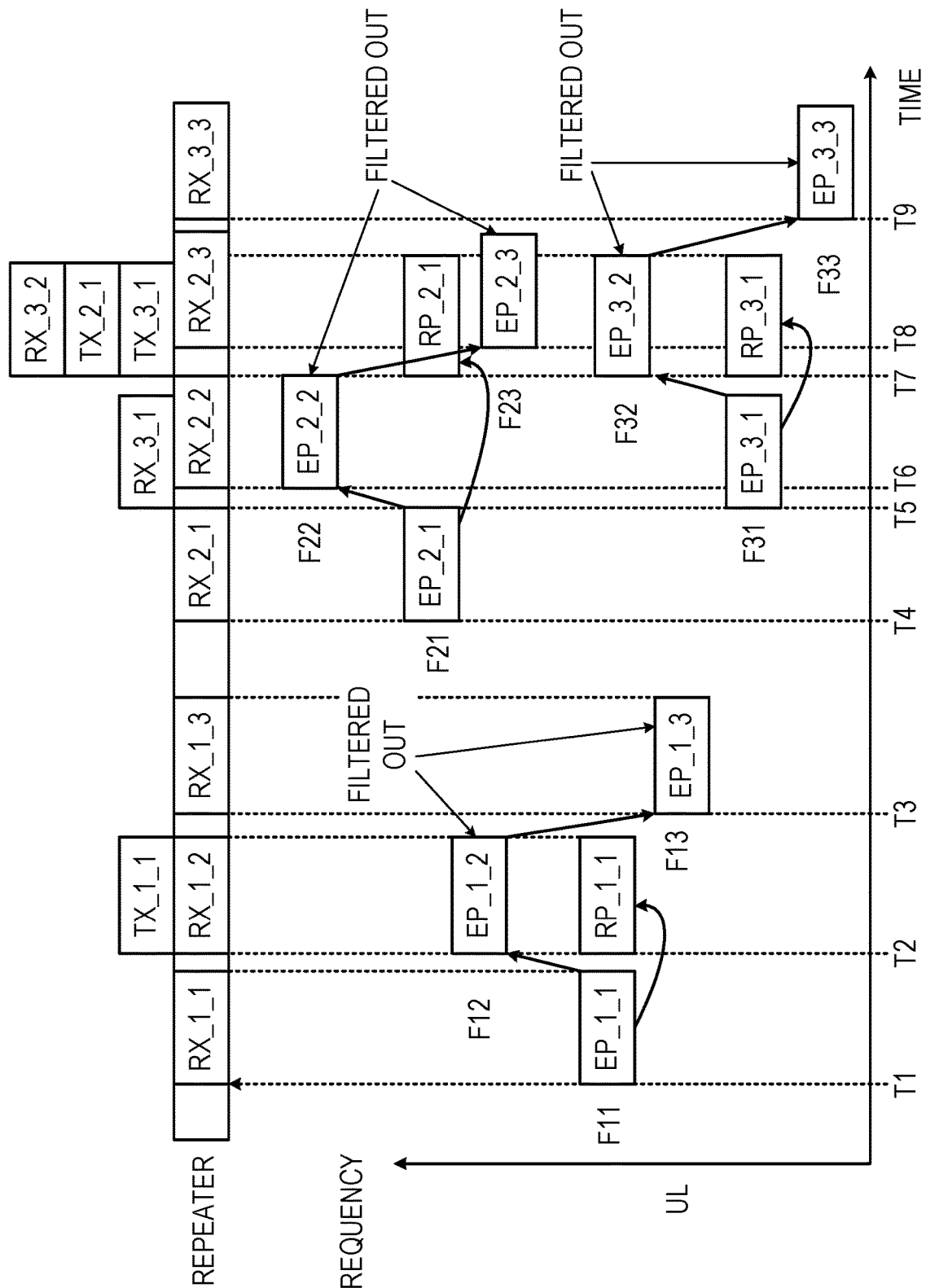
FIG. 5 is a diagram that schematically illustrates a method for selective repetition, in accordance with an embodiment that is described herein.

FIG. 5 is a diagram that schematically illustrates a method for selective repetition, in accordance with an embodiment that is described herein. The method of FIG. 5 is described as executed by processor 84 of repeater 68B, operating in a single-repetition mode. The method, however, is similarly applicable to processor 84 of repeater 68A that is configured with repeater 68D to a multi-repetition mode.

EP1 transmits multiple copies of a first uplink message over EP-BS link 42A, wherein the $n^{th}$ copy and the frequency resource used by EP1 for transmitting the first uplink message are denoted EP_1_$n$ and F1$n$, respectively. In the example of FIG. 5, EP1 transmits three copies of the first uplink message at respective times T1, T2 and T3.

The repeater activities associated with receiving the transmitted copies EP_1_1, EP_1_2 and EP_1_3 are denoted RX_1_1, RX_1_2 and RX_1_3, respectively. In this example, even when the repeater receives the transmitted copies EP_1_2 and EP_1_3, and processor 84 successfully recovers the respective messages, processor 84 re-transmits only the first copy EP_1_1, as depicted by transmission RP_1_1, and indicated as repeater activity TX_1_1. Assuming that the quality of the wireless channel between the repeater and BS1 is sufficiently high, BS1 is expected to receive repeated transmission RP_1_1 correctly with high probability, and therefore processor 84 filters out the other two copies of the same uplink message, and refrains from re-transmitting EP_1_2 and EP_1_3.

In the example of FIG. 5, at times T4, T6 and T8 repeater 68B receives copies EP_2_1, EP_2_2 and EP_2_3, of a second uplink message transmitted by EP1. The repeater additionally receives at times T5, T7 and T9 copies EP_3_1, EP_3_2 and EP_3_3 of a third uplink message transmitted by some EP.

Note that because the repeater starts receiving EP_3_1 shortly after concluding the reception of EP_2_1, processor 84 defers the transmission of the repeated message EP_2_1 to time T7, i.e., after concluding the reception of both EP_2_2 and EP_3_1. This scheduling prevents interference by transmission RP_2_1 to reception of EP_3_1. Processor 84 additionally schedules the transmission of RP_3_1, which repeats EP_3_1, to time T7. Note that although repeated transmission RP_2_1 and RP_3_1 may interfere with the reception of EP_2_3 and EP_3_2, processor 84 should filter out EP_2_3 and EP_3_2, and therefore failing to intercept EP_2_3 and EP_3_2 is allowed.

Assuming high quality channel between the repeater and BS1, processor 84 omits the re-transmission of EP_2_2 EP_2_3 EP_3_2 and EP_3_3.

By repeating redundant copies of EP messages only when necessary, the overall traffic over the air reduces considerably, and the probability of interference reduces as well. This approach also reduces computation complexity in the BS because the BS is typically required to ignore related copies of a common uplink message.

Grouping Multiple Narrowband Transmissions into a Common Frequency Channel

In some embodiments, the various elements of the LPWAN are required to meet predefined regulation and other constraints. For example, according to FCC regulations, the available uplink bandwidth is divided into 25 KHz frequency channels, and uplink transmissions are scheduled in cycles of 20 seconds per frequency channel, so that a single 25 KHz frequency channel can be allocated for a period of 400 ms within a 20-second cycle. In addition, in accordance with the FCC regulations, the total power transmitted by a device is limited to 36 dBm. In the embodiment disclosed herein, the total transmission power of all the carriers used within a 25 KHz frequency channel is limited to 36 dBm.

Figure 6:
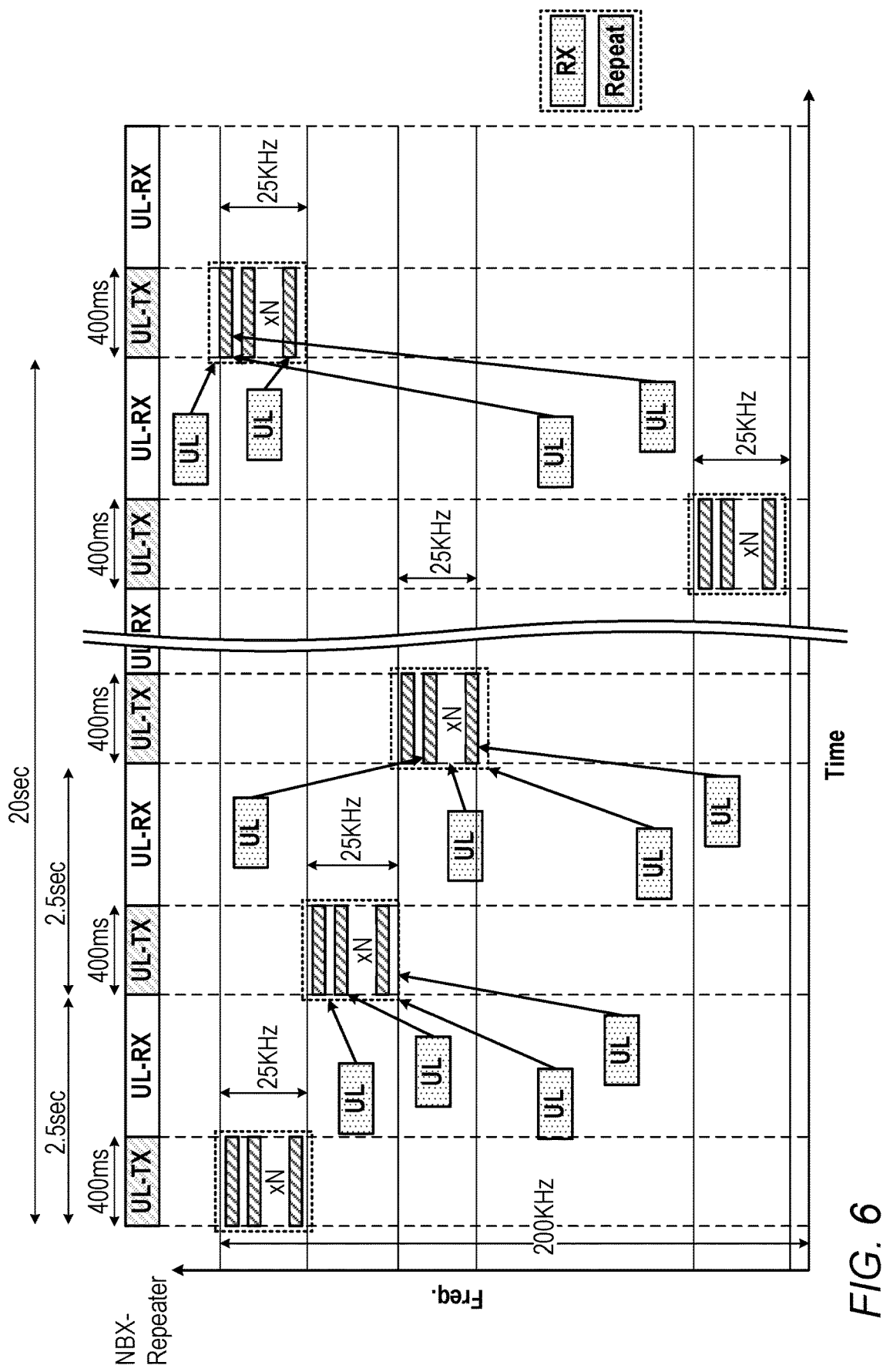
FIG. 6 is a diagram that schematically illustrates efficient scheduling scheme that groups multiple narrowband transmissions into a common frequency channel, in accordance with an embodiment that is described herein.

FIG. 6 is a diagram that schematically illustrates an efficient scheduling scheme that groups multiple narrowband transmissions into a common frequency channel, in accordance with an embodiment that is described herein. The method will described as being executed, by the processor of a relaying module, i.e., processor 84 of repeater 68, also referred to herein as "the processor" for brevity.

In FIG. 6, a cycle of 20 seconds is divided into time slots of 2.5 seconds. A 400 ms time slot within the 2.5-second slot comprises a transmission slot, denoted UL-TX, and the remaining time in the 2.5-second slot is used for reception and is denoted UL-RX. In addition, an uplink bandwidth of 200 KHz is divided into frequency channels of 25 KHz.

During a UL-RX reception period, a repeater may intercept multiple EP narrowband transmissions. The narrowband transmissions typically use different respective frequency resources (carrier frequencies). In the present example, the narrowband transmissions are 600 Hz wide. In FIG. 6, the narrowband transmissions are denoted "UL".

In some embodiments, in planning the scheduling scheme of repeated transmissions, the processor allocates different 25 KHz channels to different UL-TX slots over the 20-second cycle. Each 25 KHz frequency channel occupies up to a predefined number N of narrowband channels. For example, for the 600 Hz narrowband carriers, N=floor (25000/600)=41. Given multiple intercepted narrowband transmissions ULs, the processor plans a scheduling scheme by selecting up to N narrowband transmissions among the multiple intercepted narrowband ULs and allocating for the selected ULs a common frequency channel and a UL-TX slot. The processor executes the schedule scheme by transmitting the selected narrowband ULs using the common frequency channel during the selected UL-TX slot.

In some embodiments, the processor determines the scheduling scheme by allocating time/frequency resources under constraints of the FCC regulations. In order to meet the FCC power constraint of 30 dBm, the processor adjusts the transmission power of the grouped carriers so that the total power in a 25 KHz frequency channel remains below 30 dBm.

In some embodiments, the method of FIG. 6 is employed in a multi-repetition mode configuration. In such embodiments, the repeater is positioned at a close proximity to the relevant BS. In such embodiments, the low-power transmissions of the repeater will be received correctly at the BS with high probability. As a result, processor 84 of the repeater is configured to adjust transmissions of repeated messages to a low-power level, for meeting the FCC power constraints, in an embodiment.

In some embodiments, carrier frequencies outside the original 200 KHz band allocated for EPs and BSs can also be used. In such embodiments, the processor of the relaying module may allocate additional 25 KHz frequency channels, hence increase the overall throughput.

Efficient Re-Transmission of Downlink Messages

In LPWAN 20, a downlink message transmitted by a BS can be received by multiple relaying modules (repeaters 68) in the coverage area of the BS. For example, in FIG. 1, both repeaters 68B and 68C belong to coverage area 38A of BS1, and therefore may intercept the same downlink message transmitted by BS1. In a naïve approach, each relaying module re-transmits a received downlink message towards the EPs. Note that in general, a single EP may be covered by multiple repeaters. For example, in FIG. 1 EP2 is covered by both repeaters 68B and 68C. In the example of FIG. 1, a downlink message from BS1 will be re-transmitted by repeater 68B to EP1 and EP2, whereas the same downlink message will be re-transmitted by repeater 68C to EP3. Such a naïve approach may cause flooding the LPWAN with unnecessary re-transmissions in the downlink band, thus wasting valuable network resources. In addition, the repeated downlink transmissions may interfere with the reception of other downlink transmissions initiated by BSs and repeaters.

In some embodiments, e.g., in accordance with an underlying protocol, each relaying module is pre-configured with a different respective frequency-offset. The frequency-offset of a given relaying module, also referred to herein as "FO" thus serves as an ID of that relaying module. When the relaying module receives an uplink message that was transmitted using a frequency FU, the relaying module re-transmits this uplink message using a frequency resource FU'=FU+FO.

In some disclosed embodiments, the EPs are configured with another frequency-offset, referred to herein as $\Delta F$. The frequency-offset $\Delta F$ of the EPs is defined so that for a given uplink transmission at a frequency FU, the EP expects a respective response downlink transmission at a frequency deviation $\Delta F$ from the frequency FU of the uplink transmission. The frequency-offsets FO can be pre-assigned to the relaying modules randomly or using any other suitable method.

In some embodiments, the processor of the relaying module schedules downlink re-transmissions selectively, based on the difference between the uplink re-transmission frequency and the received response downlink frequency, thus avoiding unnecessary downlink re-transmissions. In one embodiment, when the processor receives a downlink message transmitted by the BS over EP-BS link 42, at a downlink carrier frequency FD, the processor checks whether FD deviates from the uplink carrier frequency FU' of the respective uplink re-transmission by the frequency-offset $\Delta F$. When the processor identifies that FD=FU-$\Delta F$, the downlink message corresponds to a previous uplink message repeated by that relaying module, and the processor schedules re-transmission of the downlink message toward the EPs. The processor schedules for the downlink re-transmission a frequency resource that deviates by $\Delta F$ from the original EP uplink frequency FU. Otherwise, the processor ignores the downlink message received.

Figure 7:
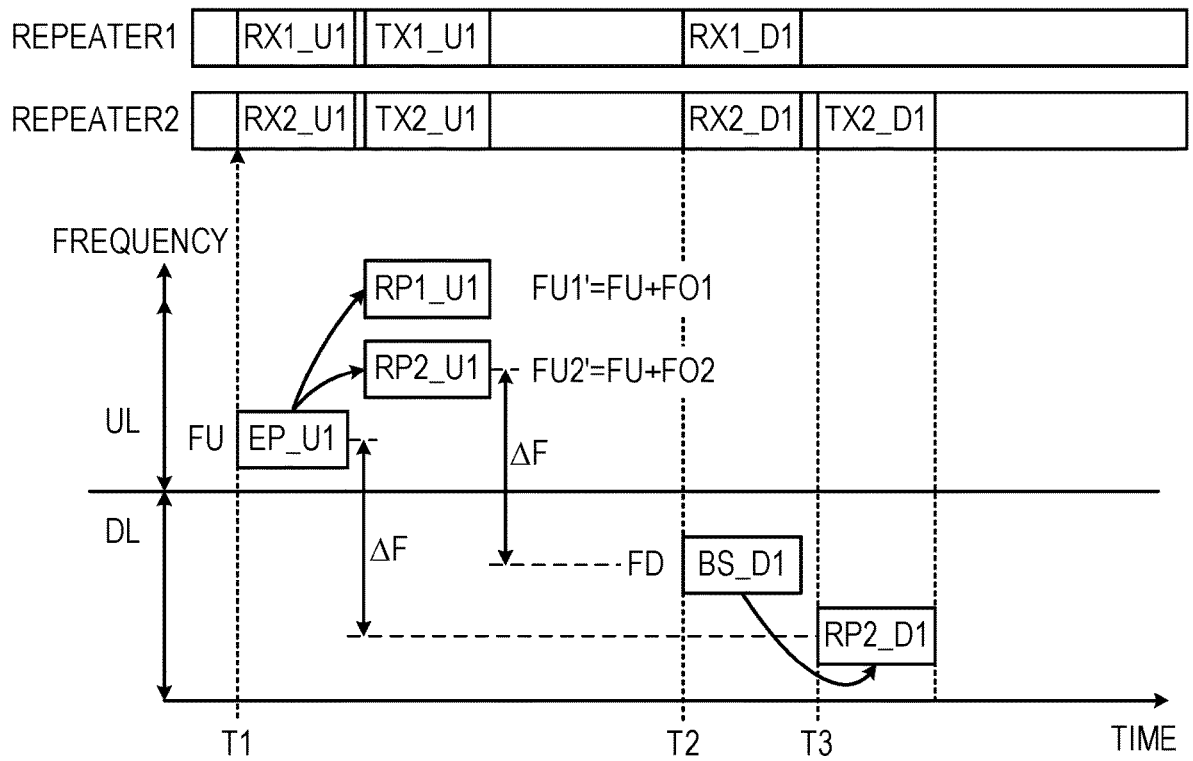
FIG. 7 is a diagram that schematically illustrates a method for selective re-transmission of downlink messages, in accordance with an embodiment that is described herein.

FIG. 7 is a diagram that schematically illustrates a method for selective re-transmission of downlink messages, in accordance with an embodiment that is described herein.

In describing FIG. 7, we assume that repeaters 68B and 68C reside within the coverage area of BS1 of FIG. 1. In FIG. 7, repeaters 68B and 68C are also denoted REPEATER1 and REPEATER2, respectively. In addition, we assume that REPEATER1 and REPEATER2 are configured with respective offset-frequencies F01 and F02.

At time T1, both repeaters 68B and 68C intercept the same uplink transmission EP_UP1 initiated by some EP in LPWAN 20. The uplink message is transmitted by the EP using an uplink frequency carrier FU. As shown in FIG. 7, processor 84 of REPEATER1 schedules re-transmission (RP1_U1) of the received uplink message using a respective carrier frequency FU1'=FU+FO1, and processor 84 of REPEATER2 schedules re-transmission (RP2_U1) of the same uplink message using a different carrier frequency FU2'=FU+FO2.

At time T2, BS1 initiates a response downlink transmission BS_D1, which is a response transmission to the chosen UL message RP2_U1 frequency FU2' with a $\Delta F$ deviation, denoted as FD. The response downlink transmission is intercepted by both REPEATER1 and REPEATER2, as indicated by repeater activities RX1_D1 and RX2_D1. BS1 transmits the downlink transmission using a downlink carrier frequency denoted FD. In the present example, we assume that the chosen UL message is RP2_U1, hence FU2'-FD equals $\Delta F$, whereas FU1'-FD is different from $\Delta F$. Under these assumptions, only processor 84 of REPEATER2 schedules re-transmission of the downlink message, at time T3, as shown by re-transmission RP2_D1, and indicated by repeater activity TX2_D1 of REPEATER2. Note that the relaying module uses for the downlink re-transmission a frequency resource that deviates from the original uplink frequency, FU, by the expected frequency-offset $\Delta F$.

In some embodiments, a relaying module avoids unnecessary downlink and/or uplink re-transmissions by holding a "black list" of EPs (e.g., a list of EP IDs) for which the relaying module should not send repeated downlink and/or uplink messages. In an embodiment, the processor of the relaying module learns the EPs listed in the black list by monitoring downlink messages received from the BS and identifying, based on the monitored messages, EPs that transmit uplink messages directly to the BS (without any re-transmission) or EPs that receive downlink transmissions from another relaying module. The processor includes the identified EPs in the black list. In another embodiment, one or more of the EPs in the black list are predefined. A black list learned can also be used for filtering uplink messages of specific EPs.

In the example of FIG. 7 above, REPEATER 1 may include the ID of the EP that transmitted the message EP_U1 in a black list so that only REPEATER 2 repeats subsequent downlink messages toward that EP.

Reporting Reception Quality of Uplink Messages

In some embodiments, processor 84 of repeater 68 estimates a metric that is indicative of the reception quality of uplink messages received from an EP over EP-BS link 42 or over wireless link 43. Processor 84 can estimate this metric, e.g., over one or more uplink messages received, using any suitable method. In some embodiments, processor 84 estimates the metric by calculating a Signal to Noise Ratio (SNR) of the received signal, or by calculating any other suitable type of metric. In some embodiments, processor 84 reports the estimated reception quality by transmitting the respective metric value as metadata in a dedicated metadata message after re-transmitting an uplink message. Alternatively or additionally, the metadata message may contain any useful information other than the reception quality metric. Metadata information other than reception quality metric may comprise, for example, repeated message indication and repeater ID.

In an embodiment, processor 84 includes in the metadata message a verification field, e.g., a Cyclic Redundancy Check (CRC) code that the processor calculates over both the uplink message and the metric value. The recipient of the metadata message uses the verification field for matching between the metadata message and the relevant uplink message, and for verifying that the metadata message and uplink message were received correctly.

In a multi-repetition mode, a repeater intercepting a metadata message re-transmits the metadata message toward the BS.

In alternative embodiments, the repeater transmits a metadata message using an out of band channel. For example, the out of band message is transmitted as a separate message per UL message. Alternatively, a combined message is transmitted for a group of multiple UL messages, e.g., using different time/frequency resource(s). The protocol used for the out of band message may be different from the protocol of the UL message.

Scheduling Uplink and Downlink Re-Transmissions in Half-Duplex and Full-Duplex Modes In some embodiments, a relaying module such as repeater 68 schedules re-transmissions of uplink and downlink messages so as to avoid interference in receiving uplink transmissions from the EPs and/or downlink transmissions from the BS. In such embodiments, the relaying module applies a "Listen Before Talk" (LBT) technique for scheduling uplink and downlink transmissions with optimal usage of time and frequency resources over the air.

In applying the LBT approach, the relaying module operates in reception mode, listening to EP uplink transmissions and/or to BS downlink transmissions, by sensing the relevant uplink and downlink frequency bands. In scheduling re-transmissions, processor 84 of a repeater selects optimal time and frequency resources for re-transmitting pending uplink messages. For example, the processor re-transmits uplink messages after concluding the reception of all active uplink transmissions from EPs. Similarly, processor 84 of the repeater optimally schedules re-transmission of pending downlink messages, e.g., until concluding the reception of all active downlink transmissions from the BS.

In some embodiments, the relaying module operates in a full-duplex mode, i.e., the relaying module supports transmitting and receiving simultaneously. In such embodiments, some of the signal transmitted by the transmitter of the RF module of the relaying module (e.g., RF module 88) may undesirably leak and/or reflected (typically with some delay) to the receiver of the RF module, and therefore interfere with reception process. In some embodiments, the relaying module uses the known transmitted signal in applying echo cancelation methods, so as to eliminate or reduce interference caused to the receiver by the transmitted signal. In some embodiments, instead of or in addition to echo cancelation, the reception path in the RF module comprises a filter that filters out undesired signals. The filter may comprise a low pass filter or a bandpass filter, and may be implemented as an analog filter, digital filter or a combination of analog and digital filters.

In some embodiments, the RF module of the relaying module separates between the transmission and reception paths by using separate transmit and receive antennas. Alternatively or additionally, the RF module separates between the transmission and reception paths using electromagnetic isolation techniques. In yet other embodiments, the RF module transmits and receives signals at different respective electromagnetic polarities.

As described above, in a multi-repetition mode of operation, the repeaters communicate with one another over link 92. In some embodiments, processor 84 of the repeater identifies, within the frequency band specified for link 92, one or more carrier frequencies that are noisy or interfered.

In such embodiments, processor 84 of the transmitting repeater maps carrier frequencies allocated for re-transmitting uplink messages that are found to be noisy, to respective actual carrier frequencies that are known to be clean. Processor 84 of the receiving repeater receives the repeated uplink messages, re-maps the actual carrier frequencies to the originally allocated carrier frequencies, and re-transmits the uplink messages to the BS using the re-mapped carrier frequencies. In the downlink direction, processor 84 of the transmitting repeater maps noisy carrier frequencies allocated for downlink transmissions over link 92, into respective clean actual carrier frequencies, and processor 84 of the receiving repeater re-maps the actual carrier frequencies back to the allocated frequencies.

Figure 8:
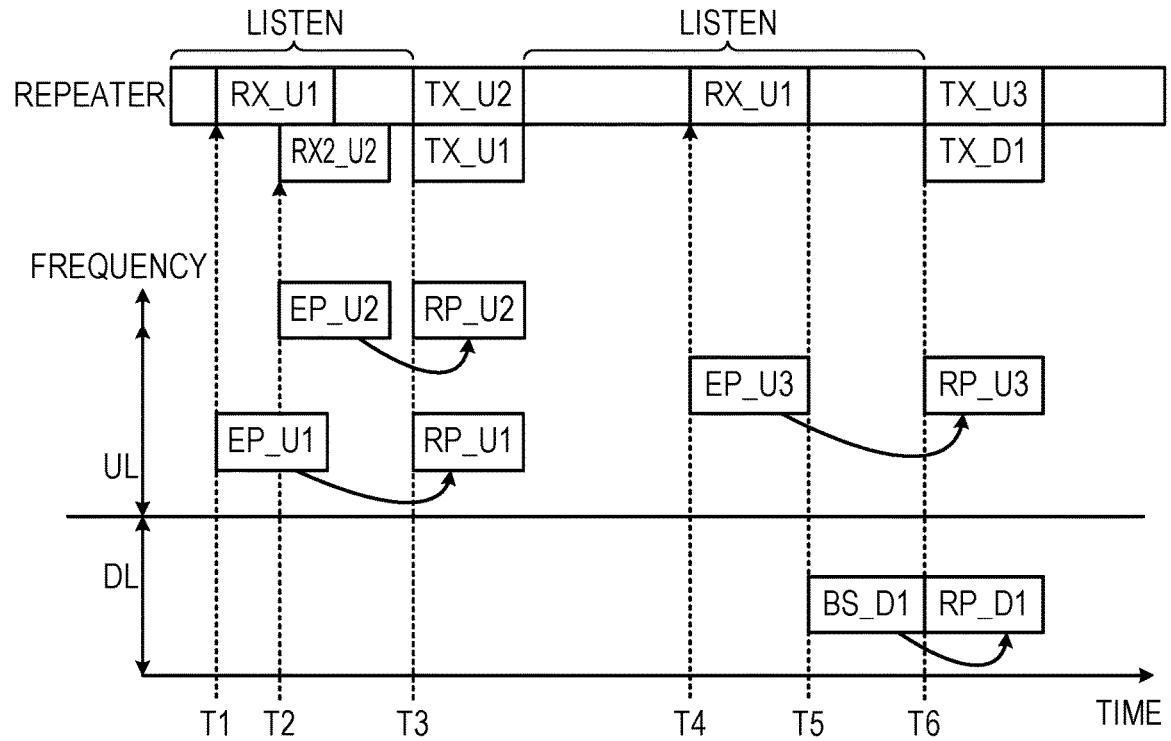
FIG. 8 is a diagram that schematically illustrates a re-transmission scheduling scheme in which time and frequency resources are allocated for avoiding interference, in accordance with an embodiment that is described herein.

FIG. 8 is a diagram that schematically illustrates a re-transmission scheduling scheme in which time and frequency resources are allocated for avoiding interference, in accordance with an embodiment that is described herein. The method is described as being executed by processor 84 of repeater 68.

In some embodiments, processor 84 schedules uplink re-transmission to a suitable time after concluding the reception of all active uplink transmissions from the EPs. By using this approach, an uplink re-transmission does not interfere in receiving subsequent overlapping uplink transmissions from EPs. In FIG. 8, the repeater intercepts uplink transmissions EP_U1 and EP_U2 starting at respective times T1 and T2. Note that when concluding intercepting EP_U1, the repeater continues intercepting EP_U2, and therefore processor 84 defers re-transmitting EP_U1 until T3. At time T3 processor 84 changes state from listening state to transmission state. Processor 84 schedules re-transmission of EP_U1 and EP_U2 to T3, as depicted by the respective repeated re-transmissions RP_U1 and RP_U2.

In some embodiments, the BS operates in a half-duplex mode, i.e., the BS cannot receive uplink transmissions over a period during which the BS transmits a downlink message. In such embodiments, the processor of the relaying module monitors the downlink band to detect BS downlink transmissions. The processor of the relaying module schedules uplink re-transmissions to a time period during which the BS does not transmit any downlink messages, and therefore the BS is free to intercept the repeater uplink re-transmission.

In FIG. 8, processor 84 of the repeater intercepts an uplink transmission EP_U3, at time T4. In the present example, when concluding receiving EP_U3, processor 84 starts intercepting a downlink transmission BS_D1 from a BS, starting at time T5. As a result, processor 84 schedules the re-transmission RP_U3 of EP_U3 to time T6. At time T6, processor 84 does not intercept any uplink transmissions or BS downlink transmissions, and therefore can safely re-transmit EP_U3 and BS_D1 as denoted by RP_U3 and RP_D1, respectively.

Note that deferring re-transmissions, e.g., as described above, is not mandatory. In some embodiments, the processor schedules uplink re-transmission that overlaps other transmissions/receptions, in accordance with global optimization requirements. For example, in an embodiment, the processor decides to re-transmit an uplink message that is pending for a long time even when overlap occurs.

Preventing Repetition Loops

In LPWAN 20, the coverage areas of multiple repeaters may overlap one another. Therefore, an uplink message may be undesirably re-transmitted by such repeaters in an infinite loop. For example, in FIG. 1, each of repeaters 68B and 68C may intercept the transmissions of the other repeater, and cause an infinite loop of interleaved re-transmissions. A re-transmission loop may also occur between repeaters of which only one repeater communicates with a BS. For example, in FIG. 1, repeater 68D re-transmits an uplink message that was received over link 92 from repeater 68A. When the repeaters reside sufficiently close to one another, repeater 68A may intercept the re-transmission of the uplink message that repeater 68D transmits to the BS over EP-BS link 42.

In LPWAN 20, avoiding re-transmission loops can be carried out in various ways, as described herein. The embodiments for preventing re-transmission loops are described as being executed by the processor of the relevant relaying module, i.e., processor 84 of repeater 68 or processor 84 of Repeater 68D.

In one embodiment, processor 84 records re-transmitted messages, e.g., by recording for each message that the processor re-transmits, the ID of the respective EP, and a sequence number of the message. When intercepting a subsequent uplink message, the processor checks the list of previously recorded EP IDs and message sequence numbers, and re-transmits only messages that were not previously recorded as re-transmitted. In some embodiments, the list of recorded EP IDs and message sequence number is limited to a time window, i.e., the processor does not re-transmit messages that were re-transmitted during the recent period of, e.g., T seconds. The window duration depends on the maximal loop time.

In another embodiment, the processor marks each re-transmitted message with a repetition-flag, for example, by setting a predefined flag field in the message to a predefined value. When the relaying module intercepts a subsequent message, the processor checks whether the message is marked as already repeated, and if so, the processor ignores that message, i.e., does not re-transmit that message. The relaying module thus re-transmits a given message only once, even when that message is intercepted by the relaying module multiple times.

In another embodiment, the processor marks a re-transmitted uplink or downlink message, by transmitting additional information that is associated with the re-transmitted message. For example, the processor transmits a marking message or a dummy carrier signal after a predefined delay relative to the re-transmitted message. In this embodiment, the processor of a relaying module receiving an uplink or downlink message, checks whether a marking message or dummy carrier has been transmitted after the predefined delay, and if so, the processor identified the message as already repeated and therefore refrains from re-transmitting that message.

In some embodiments, identifying transmissions of repeated messages is handled by using for these re-transmissions unique pattern of time scheduling, frequency allocation and transmission power, by the processor. For example, a repeater re-transmits multiple messages in parallel using a predefined pattern of multiple frequency carriers. Another repeater, which intercepts these re-transmissions, identifies that these are repeated transmissions, by recognizing the pattern of time, frequency and power used.

Reducing Delay of Response Downlink Messages

In some embodiments, the EP transmits multiple redundant copies of an uplink message, as described above. Typically, each of these message copies has a unique ID or timestamp, e.g., depending on the underlying standard or protocol. In some embodiments, an EP transmitting the uplink messages expects to receive a response downlink message, after a predefined delay. For example, in Sigfox, the EP typically opens a reception window for the response downlink message after about 20 seconds. In some embodiments, until the reception window starts, the EP shuts down its receiver or part thereof, or sets the receiver to a sleep mode, to save energy.

Since re-transmitting uplink and downlink messages by each relaying module extends the end-to-end communication time between an EP and NAS 26, the response downlink message from the NAS may arrive at the EP later than the expected reception window. Several methods can be employed to shorten the communication time between EP and NAS, as described herein.

In one embodiment, the messages are assigned respective IDs, and processor 84 of a repeater that intercepts the first copy of an uplink message, re-transmits the first copy with the ID of a subsequent copy, i.e., the ID of the second or third copy. In principle, the BS transmits a single downlink message in response to receiving each uplink message, regardless of whether or not the received uplink message is a copy of another uplink message. The BS transmits the downlink response with a delay that is shorter for each copy in the sequence. For three copies numbered i=1, 2 and 3, the respective response delays Di satisfy D1>D2>D3. The delays are configured so that the downlink response falls within the EP reception window. When the BS intercepts the first copy with the ID of the second copy, the BS assumes that the first copy was lost, and transmits the downlink response with delay D2 that is shorter than D1.

In another embodiment, the messages are assigned respective timestamps, and processor 84 of a repeater that intercepts the first copy of an uplink message re-transmits the first copy with a modified later timestamp.

In an embodiment, re-transmission of uplink and downlink messages is delayed in order to meet regulatory constraints, as described above. In such an embodiment, processor 84 of the repeater re-allocates for the message a carrier frequency that is available at an earlier time, in order to reduce the delay.

In another embodiment, the delay is caused due to low bandwidth availability, which forces processor 84 of the repeater to defer re-transmissions to periods in which one or more carrier frequencies become free for use. In this embodiment, at least transmissions over link 92 can be carried out at high data rates to reduce delays.

Reducing Traffic Load and Interference in LPWAN

In some embodiments, to reduce traffic load and interference, the processor of the relaying module (processor 84 of repeater 68) holds a "black list" of EPs whose messages should not be re-transmitted. Alternatively or additionally, the processor holds a "white list" of EPs whose messages should be re-transmitted with high priority. The EPs in the black list and in the white list may be identified using any suitable method, e.g., using the IDs of the relevant EPs.

In some embodiments, when receiving an uplink message originating from an EP in the black list, or receiving a downlink message destined to an EP in the black list, the processor refrains from re-transmitting this message.

In an embodiment, the processor schedules re-transmissions only of uplink and downlink messages that are associated with EPs in the white list. Alternatively or additionally, when time/frequency resources are limited (e.g., temporarily) the processor re-transmits uplink and downlink messages associated with EPs in the white list, with higher priority than EPs that are not listed in the white list of the relaying module.

In some embodiments, the processor of the repeater is configured to hold predefined black and/or white lists. Alternatively or additionally, the processor builds the black list and/or the white list over time, by analyzing traffic flowing through (and/or only received by) the relaying module. For example, the processor builds at least one of the black list and white list based on analyzing uplink and/or downlink messages received in the relaying module.

Scheduling Re-Transmissions Under Power Constraints

In some embodiment, the processor of the relaying module adaptively adjusts the transmission power in re-transmitting uplink and downlink messages. For example, processor 84 of repeater 68 adjusts the transmission power based on link-budget measurements. In general, reducing transmission power is advantageous for reducing power consumption in the transmitter, reducing interference among simultaneous transmissions in the LPWAN, and for meeting RF regulation constraints. In some embodiments, the processor determines the transmission power required for re-transmitting an uplink or downlink message, as the minimal transmission power that allows reliable reception at the receiver side, while meeting RF regulation constraints.

The processor of the relaying module may estimate the link-budget in various ways. In an embodiment, the processor estimates the link-budget based on suitable signal metrics related to the reception quality of uplink transmissions by the BS. Metrics that are indicative of the reception quality comprise, for example, Signal to Noise Ratio (SNR), Time of Arrival (ToA) and/or Received Signal Strength Indicator (RSSI).

In other embodiments, the processor estimates the link-budget by applying beacon measurements. A beacon is a signal that the BS broadcasts occasionally (or continuously.) Since the characteristics of the beacon transmission are predefined and known, a relaying module that receives a beacon signal, analyzes the beacon signal to deduce the link-budget, in an embodiment.

In yet other embodiments, the processor estimates the link-budget by monitoring the UL and DL messages.

In some embodiments, the relaying module adjusts the transmission power in the uplink direction by transmitting multiple uplink test messages to the BS at respective known transmission power levels. The transmission power levels may be the same or different among the uplink test messages. In an embodiment, the transmission power levels are selected above some threshold power level that guarantees reception at the BS. The uplink test messages may comprise repeated uplink messages, random uplink messages, e.g., dummy uplink messages having random content, or both.

A BS that intercepts the uplink test messages typically calculates signal metrics indicative of the reception quality. The BS records the signal metrics internally and/or delivers the signal metrics to another element in the communication network, e.g., to a central server. The BS and or other elements in the network may analyze the signal metrics of multiple received messages to determine the link budget.

In some embodiments, the relaying module receives from the BS one or more downlink messages reporting the signal metrics or information derived from the signal metrics by the BS or by one or more other elements in the communication network. The derived information is indicative of the reception quality levels of the uplink test messages by the BS. Based on the signal metrics and/or the derived information, and on the known transmission power levels of the uplink test messages, the relaying module determines a minimal transmission power level for transmitting subsequent repeated uplink messages to the BS.

In some embodiments, the relaying module transmits a sequence of dummy uplink messages using different respective transmission power levels. The processor determines the minimal transmission power to be used in subsequent uplink transmissions by identifying a response downlink message corresponding to the dummy message transmitted using the lowest power level among the dummy messages.

In some embodiments, the processor uses the estimated link-budget for determining re-transmission scheduling schemes. For example, the processor schedules for a given time resource multiple frequency carriers that together meet the estimated link-budget.

In some embodiments, the processor reduces power consumption by performing data compression techniques to the re-transmitted messages, thus reducing the overall amount of data transmitted over the air. This reduces the power consumed by the transmitter of the relaying module, and reduces the overall interference in the LPWAN. In an embodiment, the processor appends multiple messages with one preamble part and a common CRC field, thus reducing the overall redundant preamble and CRC fields transmitted over the air, which also reduces possible interference. Other suitable lossless data compression methods can also be used.

Emulating Geolocation Information

In some embodiments, the LPWAN supports estimating geolocation (e.g., geographical coordinates) of an EP based on receiving an uplink transmission of the EP by multiple BSs. This may be relevant, for example, when the EP comprises a mobile terminal whose location changes in time. In some embodiments, in order to provide the BS with geolocation information and Received Signal Strength Indicator (RSSI), the processor of the relaying module emulates to the BS direct EP-to-BS transmission. RSSI is a relative index of the received signal strength. High (or low) signal strength levels correspond to respective high (or low) RSSI values.

In some embodiments, the BS holds an RSSI factor (e.g., a multiplicative RSSI factor) that is used for compensating for the distance between the relaying module and a given EP that resides outside the BS coverage area. The processor of the relaying module adjusts the re-transmission power to the BS, so that the estimated RSSI at the BS receiver, combined with the RSSI factor, is equivalent to receiving in the BS a direct transmission from the given EP.

To preserve geolocation information of EPs outside the BSs coverage area, an uplink message should be transmitted in parallel to two or more BSs, with properly adjusted transmission power levels. In some embodiments, multiple relaying modules intercept an uplink message originating by a given EP. The processor of each of these relaying modules adjusts its own transmission power, as described above, and re-transmits the uplink message to a respective BS at the power level adjusted. Based on the RSSIs estimated in the respective BSs, the NAS can estimate the EP geolocation. Note that for the purpose of evaluating geolocation information, the re-transmissions of the uplink message by the multiple relaying modules are not necessarily aligned in time.

In some embodiments, knowledge of the repeater ID is useful for various purposes. For example, for producing EP geolocation information, the ID of the repeater that intercepts transmissions of this EP's may be required. In some embodiments, having knowledge of the repeater ID, the BS sends downlink messages destined specifically to this repeater.

Handling Roaming Wireless Devices

In some embodiments, LPWAN 20 supports multiple different specifications of the communication link used by EPs 24 over the air. For example, a given EP may operate in accordance with the specifications of wireless link 43 that are different from the specifications of EP-BS link 42 used by the BSs. This may occur, for example, when a roaming EP operates on a non-regional ISM band different from the ISM band allocated for the BSs. In addition, the bandwidth specified for uplink and downlink transmissions may differ between the BS and EP. As noted above, the protocols specified for wireless link 43 and for EP-BS link 42 may be different. Alternatively, wireless link 43 comprises a different version of EP-BS link 42.

In LPWANs of this sort, a repeater is configured to support one or more types of wireless links for communication used by EPs at its coverage area, such as both EP-BS link 42 and wireless link 43. Consider, for example, a first wireless link protocol (e.g., wireless link 43) supported by an EP and a second different wireless link protocol (EP-BS link 42) supported by the target BS. Processor 84 of the repeater intercepts an uplink message from an EP, in accordance with the wireless link 43 protocol of that EP, and re-transmits the uplink message toward the BS in accordance with EP-BS link 42 protocol of the BS. Similarly, the BS may transmit a downlink message to a respective repeater in accordance with the protocols specified for EP-BS link 42, and processor 84 of the repeater re-transmits the downlink message toward the target EP in accordance with the protocols specified for wireless link 43.

In some embodiments, the protocol conversion, e.g., between EP-BS link 42 and wireless link 43, is carried out by processor 84 of the repeater that communicates directly with the BS in a multi-repetition mode.

The embodiments described above are given by way of example, and other suitable embodiments can also be used.

Although the embodiments described herein mainly address extending the coverage of a LPWAN, e.g., for IoT devices, the methods and systems described herein can also be used in other applications, such as in other types of wireless communication networks and wireless devices.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A relaying module, comprising:
    a radio interface configured to:
        wirelessly receive multiple uplink messages originating in multiple wireless devices that communicate messages with a Base Station (BS) in a communication network; and
        wirelessly transmit repeated uplink messages of at least some of the received uplink messages toward the BS; and
    a processor, configured to:
        hold one or more transmission constraints that define limitations of using network resources for wireless transmissions in the communication network;
        receive multiple uplink messages from multiple respective wireless devices, wherein the multiple uplink messages were transmitted by the respective wireless devices using different respective narrowband carriers;
        select at least some of the received uplink messages for repeated transmission;
        allocate to the selected uplink messages respective network resources by grouping the multiple narrowband carriers into a common frequency channel, and scheduling transmission of the multiple messages during a subsequent transmission time slot using the common frequency channel, so as to maximize performance of the communication network under the transmission constraints; and
        transmit the selected uplink messages as repeated messages toward the BS, in accordance with the allocated network resources.

2. The relaying module according to claim 1, wherein the radio interface is configured to receive the uplink messages directly from a wireless device, or indirectly via another relaying module.

3. The relaying module according to claim 1, wherein the radio interface is configured to transmit the selected uplink messages directly to the BS, or indirectly via another relaying module.

4. The relaying module according to claim 1, wherein the processor is configured to allocate the network resources by selecting for a given uplink message at least one of: a time resource, a frequency resource, transmission power and an identity of one or more target BSs.

5. The relaying module according to claim 1, wherein the processor is configured to receive multiple copies of a same uplink message, wherein the multiple copies originate from a wireless device, and to filter the copies by transmitting toward the BS a partial subset of the multiple copies.

6. The relaying module according to claim 1, wherein the processor is configured to reduce an amount of information transmitted over the air, by applying to the selected uplink messages a predefined data compression coding scheme.

7. The relaying module according to claim 1, wherein the radio interface is further configured to receive from the BS a downlink transmission at a given downlink frequency, wherein the downlink transmission was initiated by the BS in response to receiving from the relaying module an uplink re-transmission at a given uplink frequency that depends on an identity of the relaying module, and wherein the processor is configured to schedule re-transmission of the downlink message in response to verifying that a difference between the given uplink frequency and the given downlink frequency equals a predefined frequency-offset.

8. The relaying module according to claim 1, wherein the radio interface is further configured to receive from the BS multiple downlink messages, wherein the processor is configured to identify, based on the downlink messages, one or more wireless devices for which the processor avoids re-transmitting uplink and downlink messages.

9. The relaying module according to claim 1, wherein the processor is configured to estimate a metric that is indicative of a reception quality over one or more uplink messages received via the radio interface, and to report the estimated metric by transmitting a dedicated metadata message containing at least the metric.

10. The relaying module according to claim 1, wherein the processor is configured to sense for activity in an uplink frequency band allocated for uplink transmissions, and after verifying that no uplink transmissions are active, to transmit a repeated uplink message toward the BS.

11. The relaying module according to claim 1, wherein the processor is configured to transmit a repeated message to another relaying module over a dedicated link, by identifying in the dedicated link one or more noisy frequencies, and splitting a transmission of the repeated message over one or more frequencies of the dedicated link, other than the noisy frequencies.

12. The relaying module according to claim 1, wherein the processor is configured to identify that a given uplink message received, was previously received in the relaying module and transmitted by the processor as a repeated message, and to refrain from scheduling a repeated transmission of the given uplink message.

13. The relaying module according to claim 1, wherein the processor is further configured to:
transmit to the BS multiple uplink test messages, wherein each uplink test message comprises a repeated uplink message or a random uplink message, and the uplink test messages are transmitted at respective known transmission power levels;
receive from the BS, in one or more downlink messages, information that is indicative of reception quality levels of the uplink test messages by the BS; and
determine, based on the information received from the BS and on the known transmission power levels of the uplink test messages, a minimal transmission power level for transmitting subsequent repeated uplink messages to the BS.

14. A method, comprising:
in a relaying module, wirelessly receiving multiple uplink messages originating in multiple wireless devices that communicate messages with a Base Station (BS) in a communication network, and wirelessly transmitting repeated uplink messages of at least some of the received uplink messages toward the BS;
holding one or more transmission constraints that define limitations of using network resources for wireless transmissions in the communication network;
receiving multiple uplink messages from multiple respective wireless devices, wherein the multiple uplink messages were transmitted by the respective wireless devices using different respective narrowband carriers;
selecting at least some of the received uplink messages for repeated transmission;
allocating to the selected uplink messages respective network resources by grouping the multiple narrowband carriers into a common frequency channel, and scheduling transmission of the multiple messages during a subsequent transmission time slot using the common frequency channel, so as to maximize performance of the communication network under the transmission constraints; and
transmitting the selected uplink messages as repeated messages toward the BS, in accordance with the allocated network resources.

15. The method according to claim 14, wherein receiving the uplink messages comprises receiving the uplink messages directly from a wireless device, or indirectly via another relaying module.

16. The method according to claim 14, wherein transmitting the selected uplink messages comprises transmitting the selected messages directly to the BS, or indirectly via another relaying module.

17. The method according to claim 14, wherein allocating the network resources comprises selecting for a given uplink message at least one of: a time resource, a frequency resource, transmission power and an identity of one or more target BSs.

18. The method according to claim 14, wherein receiving the uplink messages comprises receiving multiple copies of a same uplink message, the multiple copies originate from a wireless device, wherein selecting the uplink messages for repeated transmission comprises filtering the copies by selecting a partial subset of the multiple copies, and wherein transmitting the selected messages comprises transmitting the partial subset toward the BS.

19. The method according to claim 14, and comprising reducing an amount of information transmitted over the air, by applying to the selected uplink messages a predefined data compression coding scheme.

20. The method according to claim 14, and comprising receiving from the BS a downlink transmission at a given downlink frequency, wherein the downlink transmission was initiated by the BS in response to receiving from the relaying module an uplink transmission at a given uplink frequency that depends on an identity of the relaying module, and scheduling re-transmission of the downlink message in response to verifying that a difference between the given uplink frequency and the given downlink frequency equals a predefined frequency-offset.

21. The method according to claim 14, and comprising receiving from the BS multiple downlink messages, and identifying, based on the downlink messages, one or more wireless devices for which re-transmitting uplink and downlink messages is to be avoided.

22. The method according to claim 14, wherein receiving the uplink messages comprises estimating a metric that is indicative of a reception quality over one or more uplink messages received via the radio interface, and comprising reporting the estimated metric by transmitting a dedicated metadata message containing at least the metric.

23. The method according to claim 14, and comprising sensing for activity in an uplink frequency band allocated for uplink transmissions, and wherein transmitting the selected messages comprises transmitting a repeated uplink message toward the BS, after verifying that no uplink transmissions are active.

24. The method according to claim 14, wherein transmitting the selected messages comprises transmitting a repeated message to another relaying module over a dedicated link, by identifying in the dedicated link one or more noisy frequencies, and splitting a transmission of the repeated message over one or more frequencies of the dedicated link, other than the noisy frequencies.

25. The method according to claim 14, wherein selecting the uplink messages for repeated transmission comprises identifying that a given uplink message received, was previously received in the relaying module and transmitted as a repeated message, and refraining from scheduling a repeated transmission of the given uplink message.

26. The method according to claim 14, and comprising:

transmitting to the BS multiple uplink test messages, wherein each uplink test message comprises a repeated uplink message or a random uplink message, and the uplink test messages are transmitted at respective known transmission power levels;

receiving from the BS, in one or more downlink messages, information that is indicative of reception quality levels of the uplink test messages by the BS; and determining, based on the information received from the BS and on the known transmission power levels of the uplink test messages, a minimal transmission power level for transmitting subsequent repeated uplink messages to the BS.

27. A relaying module, comprising:

a radio interface configured to:

wirelessly receive uplink messages originating in a wireless device that communicates messages with a Base Station (BS) in a communication network;

wirelessly transmit repeated uplink messages of at least some of the received uplink messages toward the BS; and wirelessly receive from the BS multiple downlink messages; and a processor, configured to:

hold one or more transmission constraints that define limitations of using network resources for wireless transmissions in the communication network;

receive one or more uplink messages from the wireless device;

select at least some of the received uplink messages for repeated transmission;

allocate to the selected uplink messages respective network resources so as to maximize performance of the communication network under the transmission constraints;

transmit the selected messages as repeated messages toward the BS, in accordance with the allocated network resources; and identify, based on the downlink messages, one or more wireless devices for which the processor avoids re-transmitting uplink and downlink messages.

28. A relaying module, comprising:

a radio interface configured to:

wirelessly receive uplink messages originating in a wireless device that communicates messages with a Base Station (BS) in a communication network; and wirelessly transmit repeated uplink messages of at least some of the received uplink messages toward the BS; and a processor, configured to:

hold one or more transmission constraints that define limitations of using network resources for wireless transmissions in the communication network;

receive one or more uplink messages from the wireless device;

select at least some of the received uplink messages for repeated transmission;

allocate to the selected uplink messages respective network resources so as to maximize performance of the communication network under the transmission constraints; and transmit the selected messages as repeated messages toward the BS, in accordance with the allocated network resources by sensing for activity in an uplink frequency band allocated for uplink transmissions and transmitting a repeated uplink message toward the BS after verifying that no uplink transmissions are active.

29. A method, comprising:

in a relaying module, wirelessly receiving uplink messages originating in a wireless device that communicates messages with a Base Station (BS) in a communication network, wirelessly transmitting repeated uplink messages of at least some of the received uplink messages toward the BS, and wirelessly receiving from the BS multiple downlink messages;

holding one or more transmission constraints that define limitations of using network resources for wireless transmissions in the communication network;

receiving one or more uplink messages from the wireless device;

selecting at least some of the received uplink messages for repeated transmission;

allocating to the selected uplink messages respective network resources so as to maximize performance of the communication network under the transmission constraints;

transmitting the selected messages as repeated messages toward the BS, in accordance with the allocated network resources; and identifying, based on the downlink messages, one or more wireless devices for which re-transmitting uplink and downlink messages is to be avoided.

30. A method, comprising:

in a relaying module, wirelessly receiving uplink messages originating in a wireless device that communicates messages with a Base Station (BS) in a communication network, and wirelessly transmitting repeated uplink messages of at least some of the received uplink messages toward the BS;

holding one or more transmission constraints that define limitations of using network resources for wireless transmissions in the communication network;

receiving one or more uplink messages from the wireless device;

selecting at least some of the received uplink messages for repeated transmission;

allocating to the selected uplink messages respective network resources so as to maximize performance of the communication network under the transmission constraints; and transmitting the selected messages as repeated messages toward the BS, in accordance with the allocated network resources by sensing for activity in an uplink frequency band allocated for uplink transmissions, and transmitting a repeated uplink message toward the BS, after verifying that no uplink transmissions are active.

* * * * *